(12) United States Patent
Ushio et al.

(10) Patent No.: US 8,791,989 B2
(45) Date of Patent: Jul. 29, 2014

(54) IMAGE PROCESSING APPARATUS, IMAGE PROCESSING METHOD, RECORDING METHOD, AND RECORDING MEDIUM

(75) Inventors: Yoshijiro Ushio, Yokohama (JP); Yutaka Ichihara, Yokohama (JP)

(73) Assignee: Nikon Corporation, Tokyo (JP)

(*) Notice: Subject to any disclaimer, the term of this patent is extended or adjusted under 35 U.S.C. 154(b) by 62 days.

(21) Appl. No.: 13/187,497

(22) Filed: Jul. 20, 2011

(65) Prior Publication Data

US 2011/0273543 A1 Nov. 10, 2011

Related U.S. Application Data

(63) Continuation of application No. PCT/JP2010/000218, filed on Jan. 18, 2010.

(30) Foreign Application Priority Data

Jan. 21, 2009 (JP) .................................. 2009-011155
Mar. 23, 2009 (JP) .................................. 2009-070947

(51) Int. Cl.
*H04N 13/04* (2006.01)
*G02B 27/22* (2006.01)

(52) U.S. Cl.
CPC ........ *H04N 13/0497* (2013.01); *H04N 13/0404* (2013.01); *H04N 13/0409* (2013.01)
USPC ............................................ 348/51; 359/466

(58) Field of Classification Search
USPC ............... 348/42, 44, 36, 47, 51, 52, 54, 383, 348/599, 595, 584, 578; 382/294, 300, 284, 382/268, 276, 302, 295, 296, 254, 267; 359/466, 462
See application file for complete search history.

(56) References Cited

U.S. PATENT DOCUMENTS 5,883,739 A * 3/1999 Ashihara et al. ............... 359/462
6,324,001 B2 * 11/2001 Tabata ........................... 359/462
(Continued)

FOREIGN PATENT DOCUMENTS

| JP | 64-062097 | 3/1989 |
|----|-----------|--------|
| JP | 08-205201 | 8/1996 |

(Continued)

OTHER PUBLICATIONS

International Search Report with International Preliminary Report on Patentability and Written Opinion of the International Searching Authority for corresponding International Application No. PCT/JP2010/000218, Apr. 13, 2010.

(Continued)

*Primary Examiner* — Behrooz Senfi
(74) *Attorney, Agent, or Firm* — Mori & Ward, LLP

(57) ABSTRACT

Provided is an image processing apparatus that stereoscopically displays a two-dimensional image, comprising a generating section that generates a left-side image and a right-side image by shifting the two-dimensional image left and right in a display region; a right-edge processing section that attaches a right-edge image, which is displayed within a prescribed range from a right edge of the display region, to a right side of the left-side image; a left-edge processing section that attaches a left-edge image, which is displayed within a prescribed range from a left edge of the display region, to a left side of the right-side image; and an output section that outputs the left-side image with the right-edge image attached thereto to a left eye of a user and outputs the right-side image with the left-edge image attached thereto to a right eye of the user.

26 Claims, 21 Drawing Sheets

(56) References Cited

U.S. PATENT DOCUMENTS

| | | |
|---|---|---|
| 2001/0030715 A1 | 10/2001 | Tabata |
| 2005/0244050 A1 | 11/2005 | Nomura et al. |
| 2006/0087556 A1 | 4/2006 | Era |
| 2010/0091097 A1* | 4/2010 | Pockett .......................... 348/54 |
| 2010/0150523 A1* | 6/2010 | Okubo et al. .................. 386/68 |
| 2011/0234760 A1* | 9/2011 | Yang et al. ..................... 348/46 |
| 2011/0273539 A1* | 11/2011 | Yoon et al. ..................... 348/50 |
| 2011/0310097 A1* | 12/2011 | Ushio et al. .................. 345/419 |

FOREIGN PATENT DOCUMENTS

| | | |
|---|---|---|
| JP | 09-322199 | 12/1997 |
| JP | 10-117362 | 5/1998 |
| JP | 2002-262310 | 9/2002 |
| JP | 2003-134534 | 5/2003 |
| JP | 2004-102526 | 4/2004 |
| JP | 2004-208255 | 7/2004 |
| WO | 03/092304 | 11/2003 |

OTHER PUBLICATIONS

Japanese Office Action for corresponding JP Application No. 2009-070947, Feb. 26, 2013.

Chinese Office Action for corresponding CN Application No. 201080005065.5, Jun. 26, 2013.

Japanese Office Action for corresponding JP Application No. 2009-070947, Sep. 24, 2013.

\* cited by examiner

IMAGE PROCESSING APPARATUS, IMAGE PROCESSING METHOD, RECORDING METHOD, AND RECORDING MEDIUM

CROSS REFERENCE TO RELATED APPLICATION

This is a continuation application of PCT/JP2010/000218 filed on Jan. 18, 2010 which claims priority from Japanese Patent Application No. 2009-011155 filed on Jan. 21, 2009 and Japanese Patent Application No. 2009-070947 filed on Mar. 23, 2009, the contents of which are incorporated herein by reference.

BACKGROUND

1. Technical Field

The present invention relates to an image processing apparatus, an image processing method, a recording method, and a recording medium.

2. Related Art

There are conventionally known techniques for displaying a stereoscopic (3D) image. One technique for displaying a stereoscopic image involves generating a right-eye image of an object seen by the right eye and a left-eye image of the object seen by the left eye, and displaying the right-eye image to only the right eye of a user and the left-eye image to only the left eye of the user. This technique is referred to as stereoscopic viewing.

Patent Document 1: Japanese Patent Application Publication No. H10-117362
Patent Document 2: Japanese Patent Application Publication No. 2002-262310
Patent Document 3: Japanese Patent Application Publication No. H08-205201

This stereoscopic viewing technology, however, provides an image that appears unnatural to the user. With stereoscopic viewing technology, an object image displayed on the screen appears to jump out or fall back due to a parallax effect between the viewpoint of each eye of the user. Therefore, compared to looking at a normal stereoscopic object, the stereoscopic image is perceived differently by the brain, which can make the object appear unnatural. A main cause of this phenomenon is a mismatch between the convergence and the adjustment of sight, i.e. when the point at which the lines of sight intersect differs from the correct focal point of the actual object.

Furthermore, stereoscopic viewing technology is expensive, due to the need to generate parallax images to achieve the stereoscopic image. In stereoscopic viewing technology, it is necessary to generate two images, e.g. a left-side image and a right-side image, that create a parallax effect when viewed from a single location. Accordingly, when capturing an image, the parallax images must be captured by two or more cameras that are arranged and controlled appropriately, and this incurs a high cost. Furthermore, it is also expensive to generate parallax images when combining artificial images, such as in computer graphics.

There are various methods proposed for generating the parallax images based on a two-dimensional image. One such method involves displaying a plurality of images captured at different times to the right eye and the left eye, respectively. Another example involves generating the parallax images from the two-dimensional image by analyzing the two-dimensional image and having the user attach depth information thereto. However, all of these methods involve complex manual operations and judgments by the user, and also have high cost.

Another method proposed involves stereoscopically displaying an image without creating a parallax effect between the image for the left eye and the image for the right eye, as described in Patent Documents 1 to 3, for example. With these methods, however, there is no clear and specific process for suitably displaying the stereoscopic image. Furthermore, the stereoscopic image provided based on such a two-dimensional image includes portions at the right and left edges thereof in which only one of the images is displayed, and this causes the stereoscopic image to appear unnatural.

This stereoscopic viewing technology can also cause images at the edges of the display region to appear unnatural. For example, the portions of the stereoscopic image corresponding to the edges of the images can be cut off.

SUMMARY

Therefore, it is an object of an aspect of the innovations herein to provide an image processing apparatus, an image processing method, a recording method, and a recording medium, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, provided is an image processing apparatus that stereoscopically displays a two-dimensional image, comprising a generating section that generates a left-side image and a right-side image by shifting the two-dimensional image left and right in a display region; a right-edge processing section that attaches a right-edge image, which is displayed within a prescribed range from a right edge of the display region, to a right side of the left-side image; a left-edge processing section that attaches a left-edge image, which is displayed within a prescribed range from a left edge of the display region, to a left side of the right-side image; and an output section that outputs the left-side image with the right-edge image attached thereto to a left eye of a user and outputs the right-side image with the left-edge image attached thereto to a right eye of the user. Also provided is an image processing method and a recording medium storing thereon a program that causes a computer to function as the image processing apparatus.

According to a second aspect related to the innovations herein, provided is a recording method for recording an image that enables a two-dimensional image to be displayed stereoscopically, comprising generating image data of a left-side image and image data of a right-side image obtained by shifting the two-dimensional image left and right in a display region; attaching a right-edge image, which is displayed within a prescribed range from a right edge of the display region, to a right side of the left-side image; attaching a left-edge image, which is displayed within a prescribed range from a left edge of the display region, to a left side of the right-side image; recording image data of the left-side image with the right-edge image attached thereto in a left-side image data storage region in a recording medium, the left-side image data storage region holding an image to be read by a reproducing apparatus and output to a left eye of a user; and recording image data of the right-side image with the left-edge image attached thereto in a right-side image data storage region in the recording medium, the right-side image data storage region holding an image to be read by the reproducing apparatus and output to a right eye of the user. Also provided is a recording medium on which data is recorded using the recording method.

According to a third aspect related to the innovations herein, provided is an image processing apparatus that generates a display image from a two-dimensional image, comprising a display image generating section that generates the display image to be displayed within a frame provided on a border thereof, the display image obtained by shifting the two-dimensional image left and right by an amount irrespective of objects displayed in the two-dimensional image. Also provided is an image processing method and a recording medium storing thereon a program that causes a computer to function as the image processing apparatus.

According to a fourth aspect related to the innovations herein, provided is an image processing apparatus that generates a display image from a two-dimensional image, comprising a frame image generating section that that generates a frame image to be displayed as at least a portion of a frame provided on a border of the display image; and a display image generating section that generates the display image by shifting the two-dimensional image left and right within a display region within the frame by an amount irrespective of objects displayed in the two-dimensional image.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
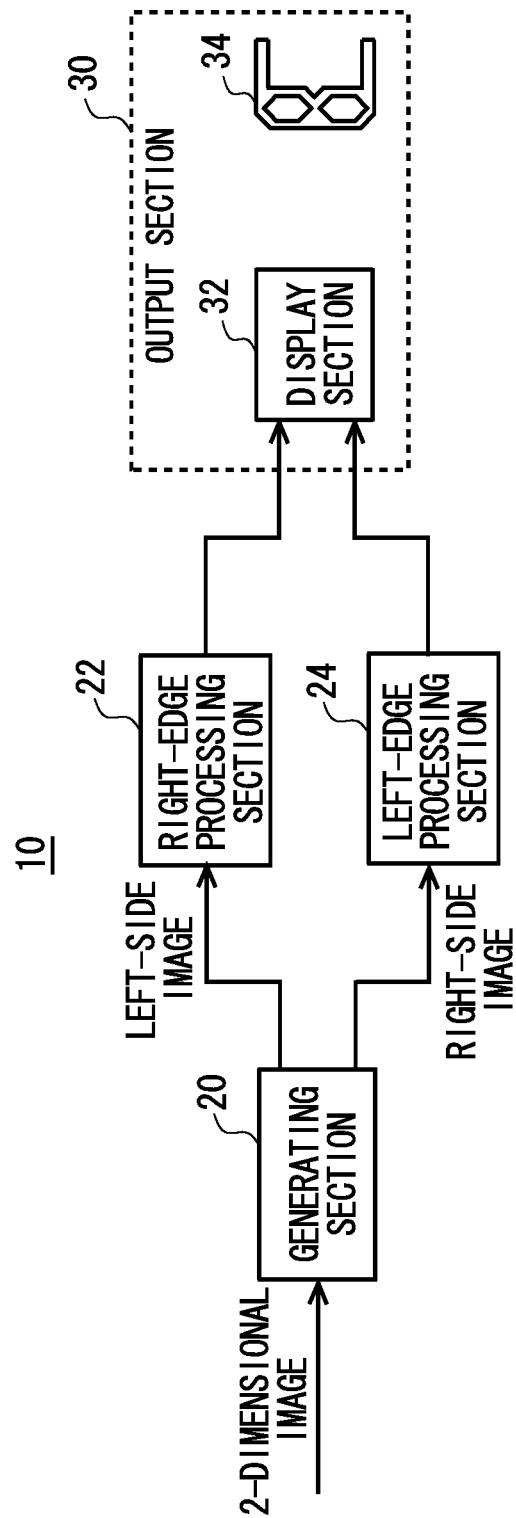
FIG. 1 shows a configuration of an image processing apparatus 10 according to a first embodiment of the present invention.

FIG. 1 shows a configuration of an image processing apparatus 10 according to a first embodiment of the present invention. The image processing apparatus 10 is capable of stereoscopically displaying a two-dimensional image provided thereto. More specifically, the image processing apparatus 10 generates an image to be output to the right eye of a user and an image to be output to the left eye of the user, based on the two-dimensional image supplied thereto, and displays the generated images on a display apparatus. The two-dimensional image may be a still image or may be a moving image that includes a plurality of still images that change over time.

The image processing apparatus 10 includes a generating section 20, a right-edge processing section 22, a left-edge processing section 24, and an output section 30. The generating section 20 may receive the two-dimensional image from a receiving apparatus that receives transmitted data or from a reproducing apparatus that reproduces data from a recording medium, for example.

The generating section 20 generates a right-side image and a left-side image, which are distanced from each other in a two-dimensional image display region by no more than the distance between the right and left pupils of a user. The generating section 20 may generate the left-side image and the right-side image based on the same two-dimensional image.

The distance between the pupils is the normal distance between the pupils of a person, i.e. from 40 mm to 90 mm. When the left-side image and the right-side image are displayed at positions separated from each other by this distance, a person can see the object displayed in the left-side image for the left eye and the object displayed in the right-side image for the right eye together as a single image, and this image can appears to be infinitely distant. In this case, the lines of sight for the eyes of the viewer are parallel. Accordingly, the generating section 20 preferably generates the left-side image and the right-side image by shifting the two-dimensional image to the left and right in the display region by more than 0 mm and less than or equal to 90 mm.

A person can see the combined image with both eyes, even if the lines of sight are shifted by 2 to 3 degrees to the left or right from the parallel state. Accordingly, the distance between the left-side image and the right-side image may be the distance obtained by shifting the line of sight of the left eye by three degrees or less, preferably two degrees or less, to the left from the parallel state and shifting the line of sight of the right eye by three degrees or less, preferably two degrees or less, to the right from the parallel state. The tolerable amount that the distance between the left-side image and the right-side image may differ from the distance between the pupils is greater when the distance between the viewer and the display surface is greater.

The display region is a region of an image display section in the display apparatus for providing the user with the stereoscopic image. More specifically, the display region may be formed in a single screen, such as the display surface of a television or one window displayed in a monitor of a computer. As another example, the display region may be a region formed by two screens, such as the display surfaces of a head-mounted display. The generating section 20 may change the distance between the left-side image and the right-side image, as measured by pixels, according to the size of the display region and the pixel size of the two-dimensional image supplied thereto, such that the actual distance between the left-side image and the right-side image in the display region is equal to the distance between the pupils of the user.

The generating section 20 generates the left-side image by shifting the original two-dimensional image to the left, for example. The generating section 20 generates the right-side image by shifting the original two-dimensional image to the right, for example. The generating section 20 may delete a portion of the left-side image, obtained by shifting the original two-dimensional image to the left, protruding to the left from the right-side border of the display region. The generating section 20 may delete a portion of the right-side image, obtained by shifting the original two-dimensional image to the right, protruding to the right from the left-side border of the display region.

If the image processing apparatus 10 provides the stereoscopic image using a display apparatus that has one display region, the generating section 20 may use an image displayed on one set of horizontal lines in the display region selected alternately in the vertical direction, e.g. even-numbered lines, as the left-side image. The generating section 20 may use an image displayed on the other set of horizontal lines in the display region selected alternately in the vertical direction, e.g. odd-numbered lines, as the right-side image.

As another example, if the image processing apparatus 10 provides the stereoscopic image using a display apparatus that has one display region, the generating section 20 may use an image displayed in one set of frames selected alternately over time from among the frames of a moving image, e.g. even-numbered frames, as the left-side image. The generating section 20 may use an image displayed in the other set of frames selected alternately over time from among the frames of the moving image, e.g. odd-numbered frames, as the right-side image.

If the image processing apparatus 10 provides the stereoscopic image using a display apparatus that has a left-eye display screen and a right-eye display screen, such as a head-mounted display, the generating section 20 displays the image shown in the left-eye display screen as the left-side image and displays the image shown in the right-eye display screen as the right-side image.

The generating section 20 may perform a process to generate the left-side image and the right-side image using a software computation of a computer. Instead, the generating section 20 may perform image processing in real time on a vide signal that is reproduced or transmitted in real time.

The right-edge processing section 22 attaches a right-edge image, which is displayed in a prescribed range from the right edge of the display region, to the right side of the left-side image. For example, the right-edge processing section 22 may attach the right-edge image to an empty region on the right side of the left-side image created as a result of the original two-dimensional image being shifted to the left. A detailed example of the right-edge image attached by the right-edge processing section 22 is provided further below.

The left-edge processing section 24 attaches a left-edge image, which is displayed in a prescribed range from the left edge of the display region, to the left side of the right-side image. For example, the left-edge processing section 24 may attach the left-edge image to an empty region on the left side of the right-side image created as a result of the original two-dimensional image being shifted to the right. A detailed example of the left-edge image attached by the left-edge processing section 24 is provided further below.

The output section 30 includes a display region in which a region where the left-side image and the right-side image are not superimposed on each other is positioned outside the effective field of vision of the user. Using this display region, the output section 30 outputs the left-side image with the right-edge image attached thereto to the left eye of the user. Using this display region, the output section 30 outputs the right-side image with the left-edge image attached thereto to the right eye of the user.

For example, the output section 30 may display the left-side image and the right-side image superimposed on each other within a display region formed on a single screen, such as a stationary liquid crystal display. Instead, the output section 30 may display the left-side image and the right-side image independently in a display region formed by two screens, such as a head-mounted display.

In the present embodiment, the output section 30 includes a display section 32 and stereoscopic viewing glasses 34. The display section 32 includes a plurality of pixels arranged in a two-dimensional matrix forming a display region in which pixel lines for displaying an image to the right eye of the user and pixel lines for displaying an image to the left eye of the user are arranged in an alternating manner. The stereoscopic viewing glasses 34 transmit the image displayed by the pixel lines of the display section 32 displaying the image for the right eye to only the right eye of the user, and transmit the image displayed by the pixel lines of the display section 32 displaying the image for the left eye to only the left eye of the user. When the output section 30 includes the display section 32 and the stereoscopic viewing glasses 34, the generating section 20 generates the left-side image from the pixels of the two-dimensional image corresponding to the pixel lines used for the left eye in the display region, and generates the right-side image from the pixels of the two-dimensional image corresponding to the pixel lines used for the right eye in the display region. The generating section 20 can generate the left-side image and the right-side image by shifting the pixel data horizontally in groups of pixel lines, and therefore the generating section 20 can have a simple circuit configuration.

The display section 32 may emit circularly-polarized light with a first rotational direction from the left-eye pixel lines. The display section 32 may emit circularly-polarized light with a second rotational direction, which is the opposite of the first rotational direction, from the right-eye pixel lines. The display section 32 displays the left-side image resulting from the left-eye pixel lines and the right-side image resulting from the right-eye pixel lines.

The stereoscopic viewing glasses 34 include a left-eye polarization filter, which is arranged over the left eye of the user to transmit circularly-polarized light having the first rotational direction and block circularly-polarized light having the second rotational direction, and a right-eye polarization filter, which is arranged over the right eye of the user to transmit circularly-polarized light having the second rotational direction and block circularly-polarized light having the first rotational direction. As a result, the stereoscopic viewing glasses 34 can provide the left-side image displayed by the left-eye pixels lines of the display section 32 to the left eye and the right-side image displayed by the right-eye pixels lines of the display section 32 to the right eye.

The output section 30 may have any configuration, as long as it can provide the left-side image to only the left eye of the user and provide the right-side image to only the right eye of the user. For example, the output section 30 may include a display apparatus that displays the left-side image and the right-side image alternately over time, and shuttered glasses having shutters synchronized with the display apparatus. In this case, the shuttered glasses open the left-eye shutter and close the right-eye shutter when the left-side image is being displayed, and close the left-eye shutter and open the right-eye shutter when the right-side image is being displayed. With this output section 30, the left-side image can be provided only to the left eye of the user and the right-side image can be provided only to the right eye of the user.

As another example, the output section 30 may be a head-mounted display having a left-eye display screen and a right-eye display screen. The output section 30 may use color filters or differences in light splitting characteristics or polarization directions to provide the left-side image only to the left eye of the user and the right-side image only to the right eye of the user.

In the manner described above, the image processing apparatus 10 generates a stereoscopic image by shifting a two-dimensional image to the right and left. As a result, the image processing apparatus 10 can provide a user with a stereoscopic image at a low cost using an extremely simple process.

Figure 2:
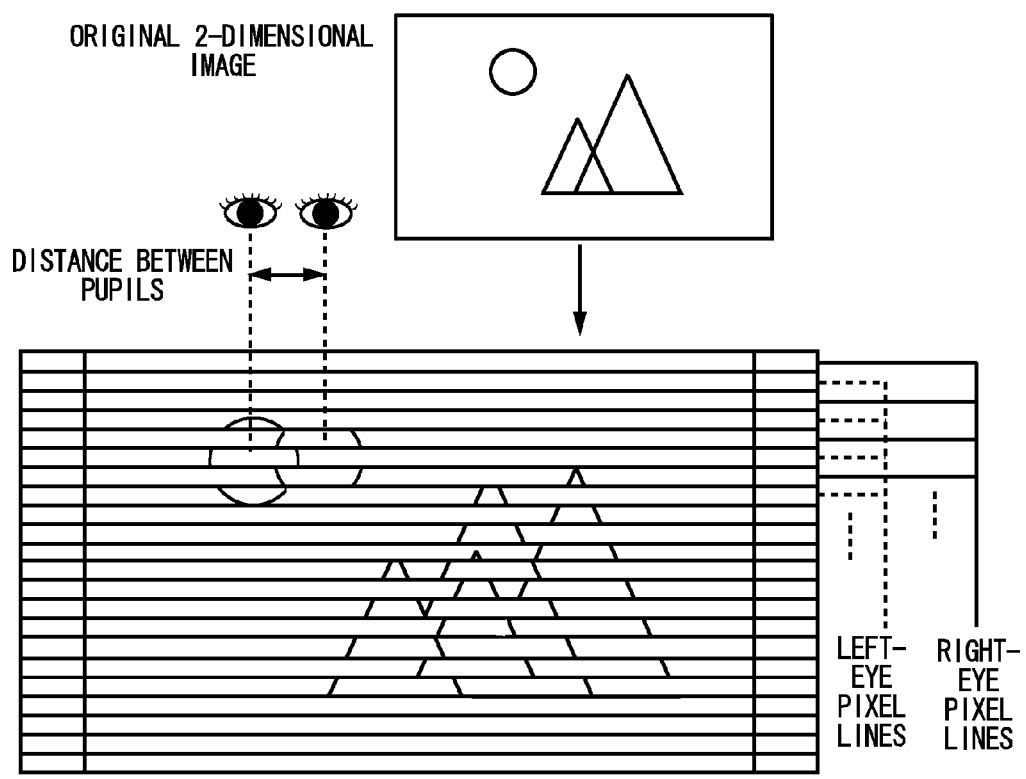
FIG. 2 shows an exemplary display on the display section 32.

FIG. 2 shows an exemplary display on the display section 32. In the display section 32, the left-eye pixel lines are one set of horizontal lines in the display region selected alternately in the vertical direction, e.g. even-numbered lines, and the right-eye pixel lines are the other set of horizontal lines selected alternately in the display region in the vertical direction, e.g. odd-numbered lines. In this case, the generating section 20 generates the left-side image from the pixels of the two-dimensional image corresponding to the left-eye pixel lines in the display region of the display section 32, and generates the right-side image from the pixels of the two-dimensional image corresponding to the right-eye pixel lines used in the display region of the display section 32. Therefore, in combination with the stereoscopic viewing glasses 34, the display section 32 can provide the left-side image displayed by the left-eye pixel lines to only the left eye and provide the right-side image displayed by the right-eye pixel lines to only the left eye.

Figure 3:
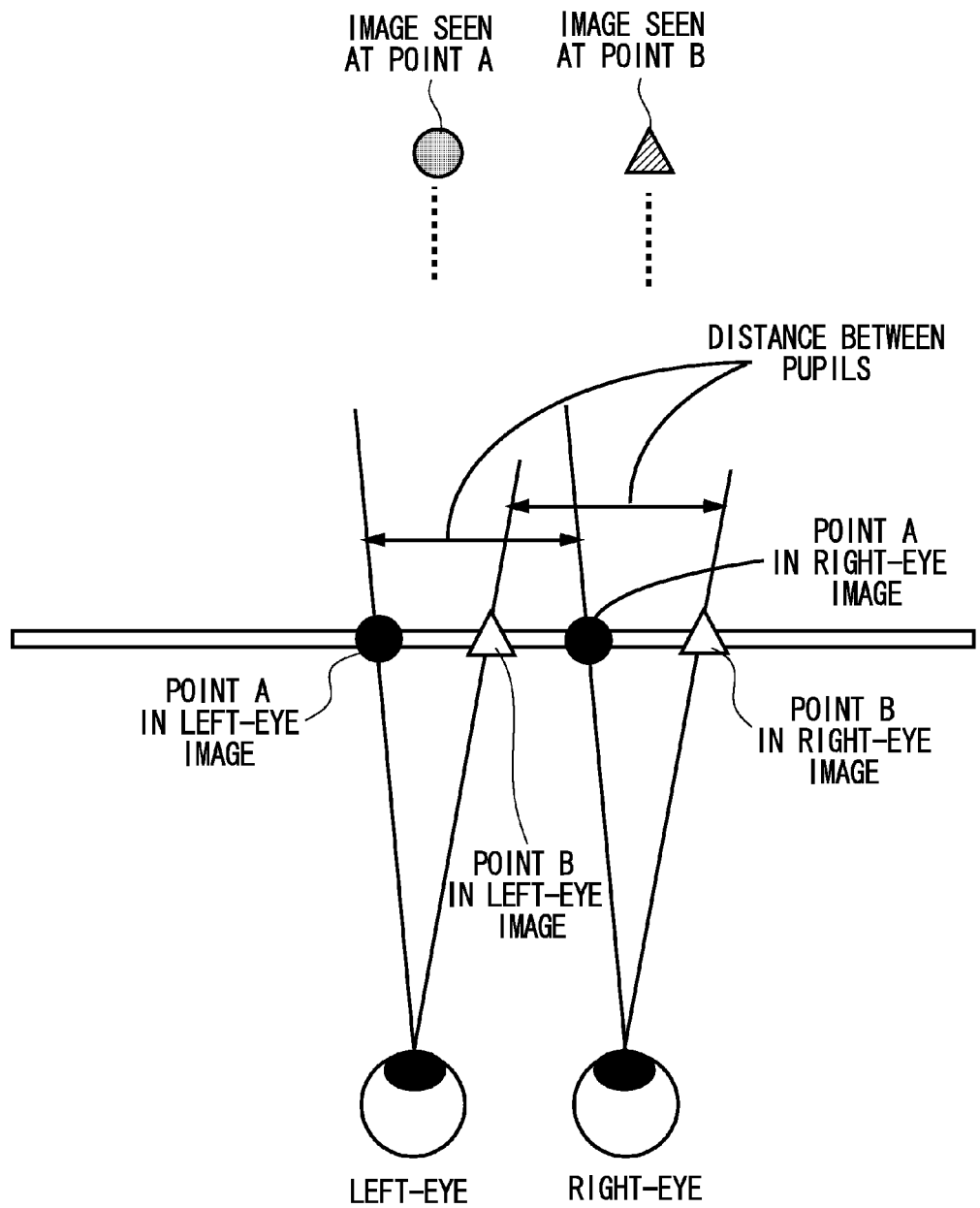
FIG. 3 shows examples of a point where the left-side image is displayed, a point where the right-side image is displayed, and the resulting image perceived by the user.

FIG. 3 shows examples of a point where the left-side image is displayed, a point where the right-side image is displayed, and the resulting image perceived by the user. When a person looks at a two-dimensional image at a short distance, the person experiences a parallax effect that causes the image provided to the left eye and the image provided to the right eye to appear different. Based on this parallax effect, a person can recognize that the object being viewed is two-dimensional. When a person views an object that is infinitely distant, e.g. at a distance of 10 meters or more, the image provided to the left eye and the image provided to the right eye appear the same. When a person views an object that is infinitely distant, the lack of parallax effect between the image provided to the left eye and the image provided to the right eye causes the person to perceive the object as a real-life stereoscopic object.

The image processing apparatus 10 generates the right-side image and the left-side image without the parallax effect by shifting the original image to the right and left by a distance equal to the distance between the pupils of the user. In other words, the image processing apparatus 10 generates the right-side image and the left-side image to appear the same. The image processing apparatus 10 provides the left-side image to only the left eye of the user and provides the right-side image to only the right eye of the user. As a result, the image processing apparatus 10 can cause the lines of sight of the left eye and the right eye of the user to be parallel. In other words, the lines of sight of each eye of the user do not converge, i.e. the lines of sight do not cross each other. Therefore, the image processing apparatus 10 can cause the user to perceive an object as being infinitely distant. For example, as shown in FIG. 3, the image processing apparatus 10 causes the user to perceive both point A (the black circle) and point B (the triangle) at an infinitely distant position.

By providing an image that does not create a parallax effect between the left and right eyes and that appears infinitely distant to the user, the image processing apparatus 10 can provide the user with an image that seems stereoscopic. For example, the image processing apparatus 10 can create the feeling that the user is looking through a window at an image of a landscape. Furthermore, the image processing apparatus 10 can create the impression that an image captured close-up, such as using a macro exposure, is being viewed through a magnifying glass.

The reason why the image processing apparatus 10 can provide an image that seems so realistic is explained below. The image processing apparatus 10 does not cause the lines of sight of the user to converge, and therefore the user cannot identify the position of an object in the image based on the parallax effect. However, even if there is no parallax effect, a person can estimate the position of an object image based on the size and angle of the actual object derived from experience and common sense. The person can then instantaneously and unconsciously estimate the position of the object to get a sense of the stereoscopic nature and dimensions of the object. Accordingly, even though the image processing apparatus 10 does not cause the lines of sight of the eyes of the user to converge, the user is still provided with an image that seems real.

When a person views a moving image, the objects that are farther away appear to move less and objects that are closer appear to move more. When viewing a moving image, a person obtains a greater sense of the image being stereoscopic from the movement of the objects therein than from the parallax effect. Accordingly, when displaying a moving image, the image processing apparatus 10 can more strongly impress upon the user the feeling that the objects are stereoscopic.

The image processing apparatus 10 does not cause a "cardboard effect," which is a phenomenon whereby objects appear to be flattened in depth, nor does the image processing apparatus 10 cause a "puppet-theater effect," which is phenomenon whereby the impression that an image expands laterally is lessened due to the perception of depth being emphasized. Accordingly, the image processing apparatus 10 can provide a stereoscopic image that appears realistic and natural.

The image processing apparatus 10 does not cause the lines of sight of the eyes of the user to converge. As a result, a mismatch between convergence and adjustment of the view of the user does not occur, thereby decreasing the feeling that the image is unnatural. Furthermore, the image processing apparatus 10 causes the stereoscopic images to appear at positions beyond the screen, thereby impressing upon the user a sense that they are looking through a frame, such as a window or a magnifying glass. Accordingly, the image processing apparatus 10 does not cause a phenomenon whereby the images seeming to jump out from the screen are unnaturally cut off by the screen frame, and can therefore provide the user with a natural stereoscopic image.

Figure 4:
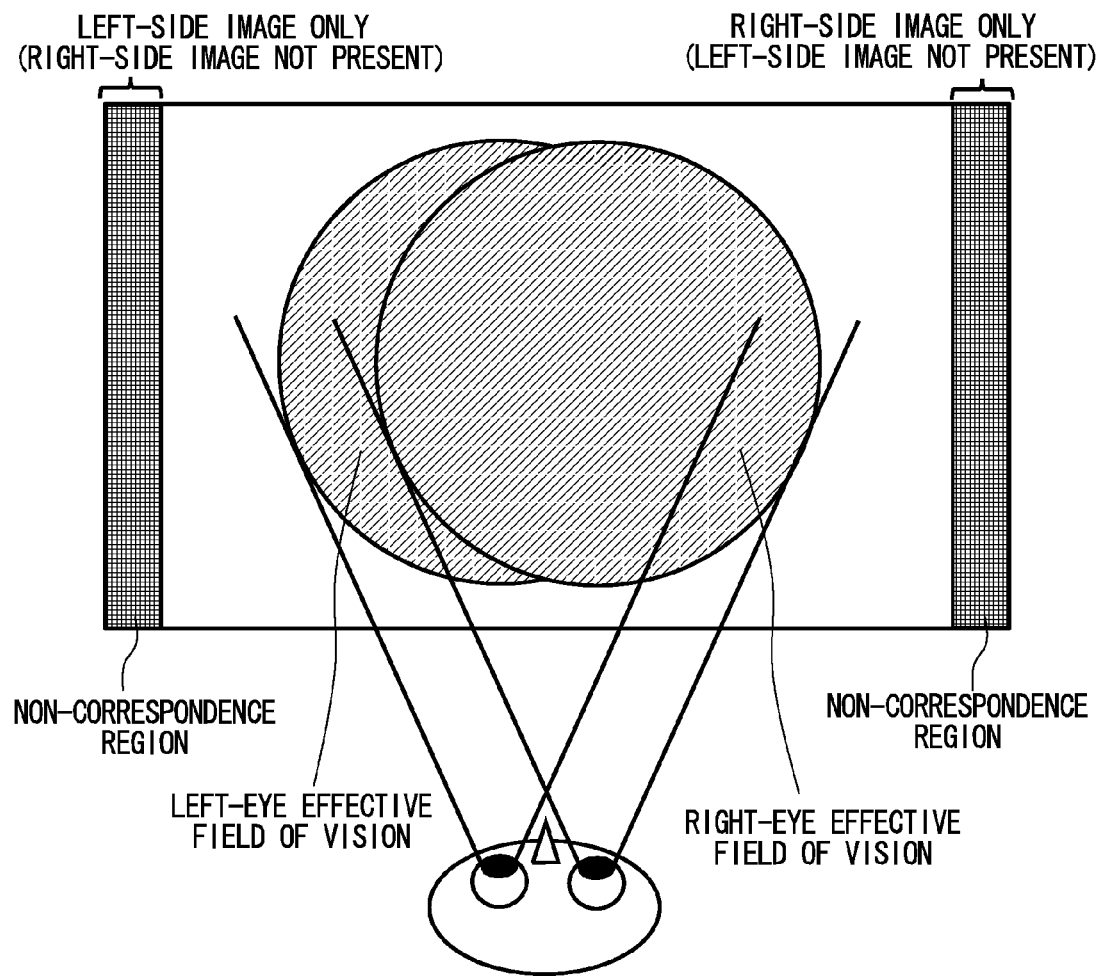
FIG. 4 shows examples of an effective field of vision of a user in the display region and a non-correspondence region, in which only one of the left-side image and the right-side image is displayed.

FIG. 4 shows examples of an effective field of vision of a user in the display region and a non-correspondence region, in which only one of the left-side image and the right-side image is displayed. The left edge of the display region includes a non-correspondence region in which the left-side image, but not the right-side image, resulting from the shifting of one two-dimensional image to the left and right is displayed. The right edge of the display region includes a non-correspondence region in which the right-side image, but not the left-side image, resulting from the shifting of one two-dimensional image to the left and right is displayed. The non-correspondence regions cannot provide a stereoscopic image to the user.

A region visible to a person includes an effective field of vision and a peripheral field of vision. The effective field of vision has excellent resolving power and color recognition, uses lines of sight that move quickly, and is used to consciously recognize objects. In other words, when viewing a television image or a painting, for example, the effective field of vision is the range that the viewer is aware of. The peripheral field of vision can be dimly sensed by the viewer, but is practically useless for cognitive recognition, such as identifying who someone is or reading letters.

The image processing apparatus 10 preferably displays the left-side image and the right-side image in a display region that is large enough that the non-correspondence regions are positioned outside the effective field of vision. Therefore, the image processing apparatus 10 can prevent the user from being consciously aware of the images shown in the non-correspondence regions that cannot provide stereoscopic images.

The image processing apparatus 10 preferably displays the left-side image and the right-side image in a display region whose horizontal width is expressed by Expression 1 shown below. In Expression 1, W represents the horizontal width of the display region, D represents the distance from the viewpoint of the user to the display screen, L represents the distance between the pupils of the user, and θ represents the angle of the effective field of vision of the user. Here, θ is usually approximately 20°.

$$W \geq (3 \times L) + (2 \times D \times \mathrm{Sin}(\theta/2))$$ Expression 1

In other words, the horizontal width W of the display region is preferably greater than or equal to the sum of three times the distance between the pupils (3×L) and the product of the sine of half the angle of the field of vision and double the distance from the viewpoint of the user to the display screen (2×D×Sin(θ/2)).

Based on the above, the generating section 20 generates the left-side image and the right-side image for a display region whose horizontal width is expressed by Expression 1. As a result, the image processing apparatus 10 can provide a stereoscopic image that looks natural.

The generating section 20 may generate the left-side image and the right-side image by shifting the two-dimensional image to the right and left to provide a stereoscopic image to the user, on a condition that the screen of the display section 32 has a width W expressed by Expression 1. With a widescreen (aspect ratio 16:9) television, the distance from the viewpoint of the user to the center of the display screen should be approximately three times the vertical screen size. Accordingly, the generating section 20 can provide the user with a stereoscopic image on a condition that the display section 32 is a wide-screen television with a width of 20 inches or more, for example.

Figure 5:
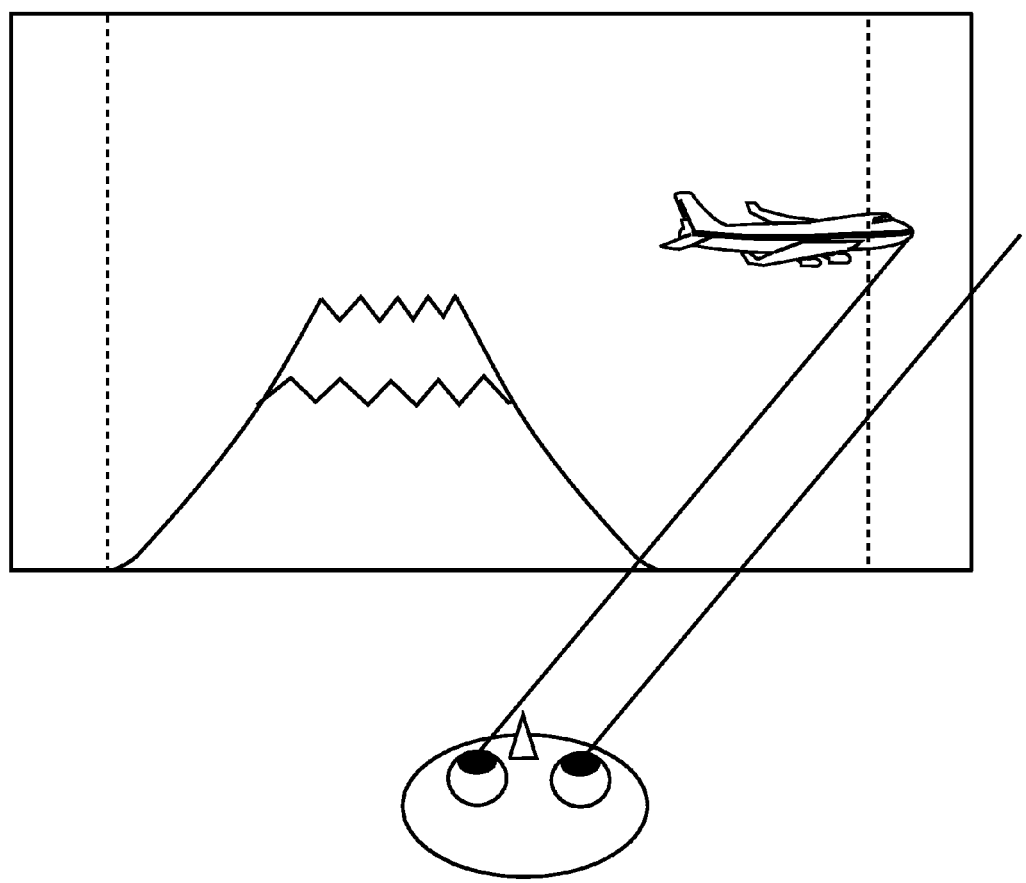
FIG. 5 shows exemplary lines of sight when the user focuses on the right-edge portion of the display region.

FIG. 5 shows exemplary lines of sight when the user focuses on the right-edge portion of the display region. When viewing the display region, a person usually focuses on the center of the display region and not the edges. Therefore, if the horizontal width of the display region satisfies Expression 1, the image processing apparatus 10 usually does not provide the user with an image that seems extremely unnatural.

However, when an object being focused on is displayed in the left-edge portion or the right-edge portion of the display region or when an object being focused on moves from the center to the left-edge portion or the right-edge portion, a person focuses on the left-edge portion or the right-edge portion of the display region. When the user focuses on the left-edge portion or the right-edge portion of the display region and the lines of sight of the user do not converge, as shown in FIG. 5, the line of sight of one eye is within the display region, while the line of sight of the other eye is outside the display region. This disruptive feeling occurring at the edge portions affects the overall viewing experience.

When looking at scenery through a window frame, a person does not experience this disruptive feeling. Accordingly, the image processing apparatus 10 can provide the user with a natural stereoscopic image at the left-edge and right-edge portions of the display region by providing a display that makes the user aware of a frame.

Figure 6:
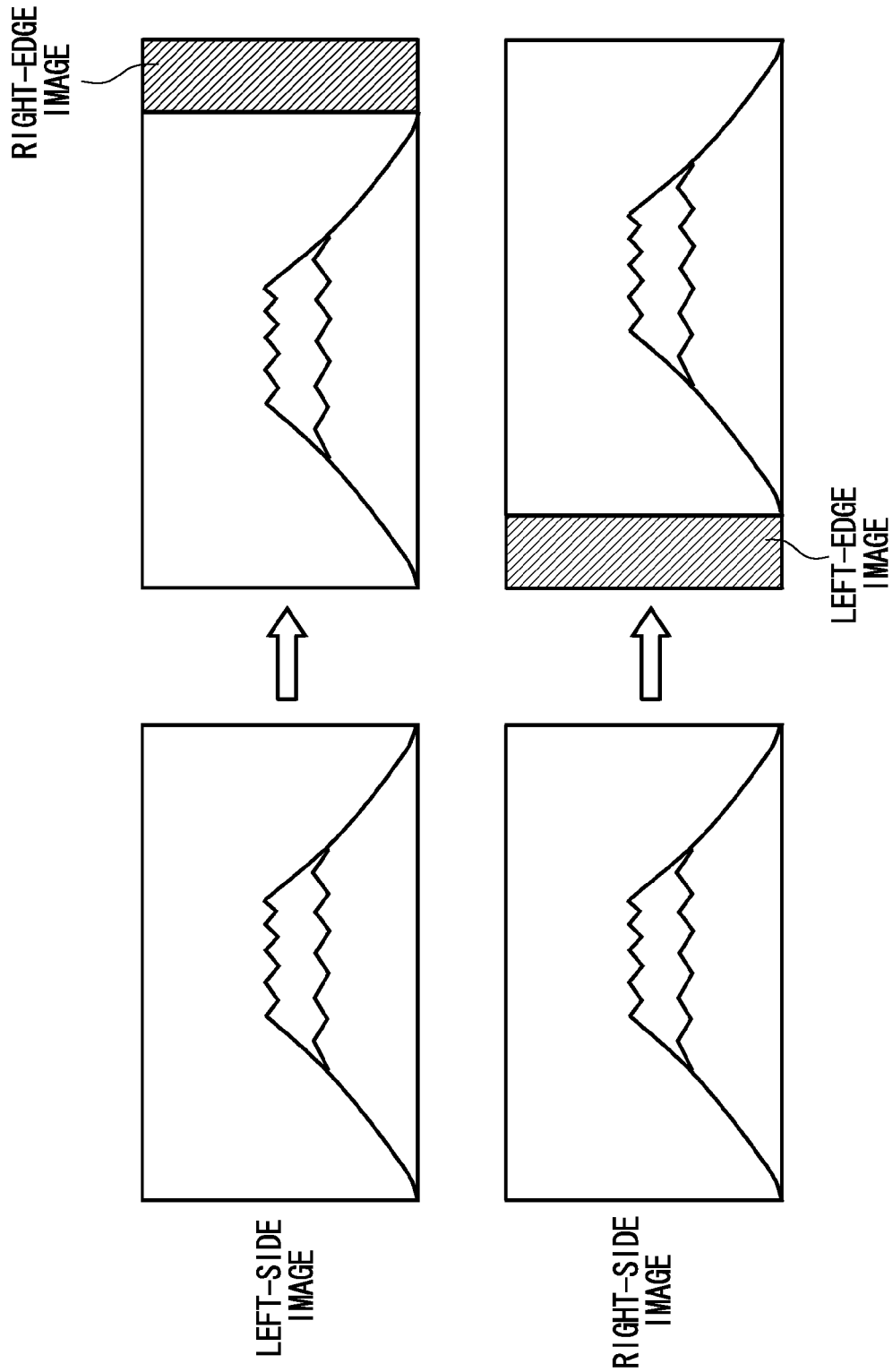
FIG. 6 shows an exemplary left-side image with a single-color right-edge image attached thereto and an exemplary right-side image with a single-color left-edge image attached thereto.

FIG. 6 shows an exemplary left-side image with a single-color right-edge image attached thereto and an exemplary right-side image with a single-color left-edge image attached thereto. The right-edge processing section 22 may attach a single-color right-edge image, which is displayed in a prescribed range from the right edge of the display region, to the right side of the left-side image. As another example, the right-edge processing section 22 may attach a right-edge image, which is displayed in a prescribed range from the right edge of the display region, having a dark color such as black or a light color such as white to the right side of the left-side image. The right-edge processing section 22 may attach a right-edge image having a dark color such as black or a light color such as white to an empty region on the right side of the left-side image in the display region created as a result of the original two-dimensional image being shifted to the left.

The left-edge processing section 24 may attach a left-edge image, which is displayed in a prescribed range from the left edge of the display region, having a dark color such as black or a light color such as white to the left side of the right-side image. The left-edge processing section 24 may attach a left-edge image having a dark color such as black or a light color such as white to an empty region on the left side of the right-side image in the display region created as a result of the original two-dimensional image being shifted to the right.

The image processing apparatus 10 can provide a display that appears as a frame in the right-edge portion and left-edge portion of the display region by attaching the left-edge image and right-edge image described above. As a result, the image processing apparatus 10 can provide a user with a natural stereoscopic image, such as seen when viewing scenery through a window frame.

The right-edge processing section 22 further attaches a frame image of a dark color such as black or a light color such as white with a width greater than or equal to the distance between the pupils of the user, to the left and right sides of the left-side image to which the right-edge image is attached. Similarly, the left-edge processing section 24 further attaches a frame image of a dark color such as black or a light color such as white with a width greater than or equal to the distance between the pupils of the user, to the left and right sides of the right-side image to which the left-edge image is attached. As a result, the image processing apparatus 10 can display a clearly visible frame in the display region.

Figure 7:
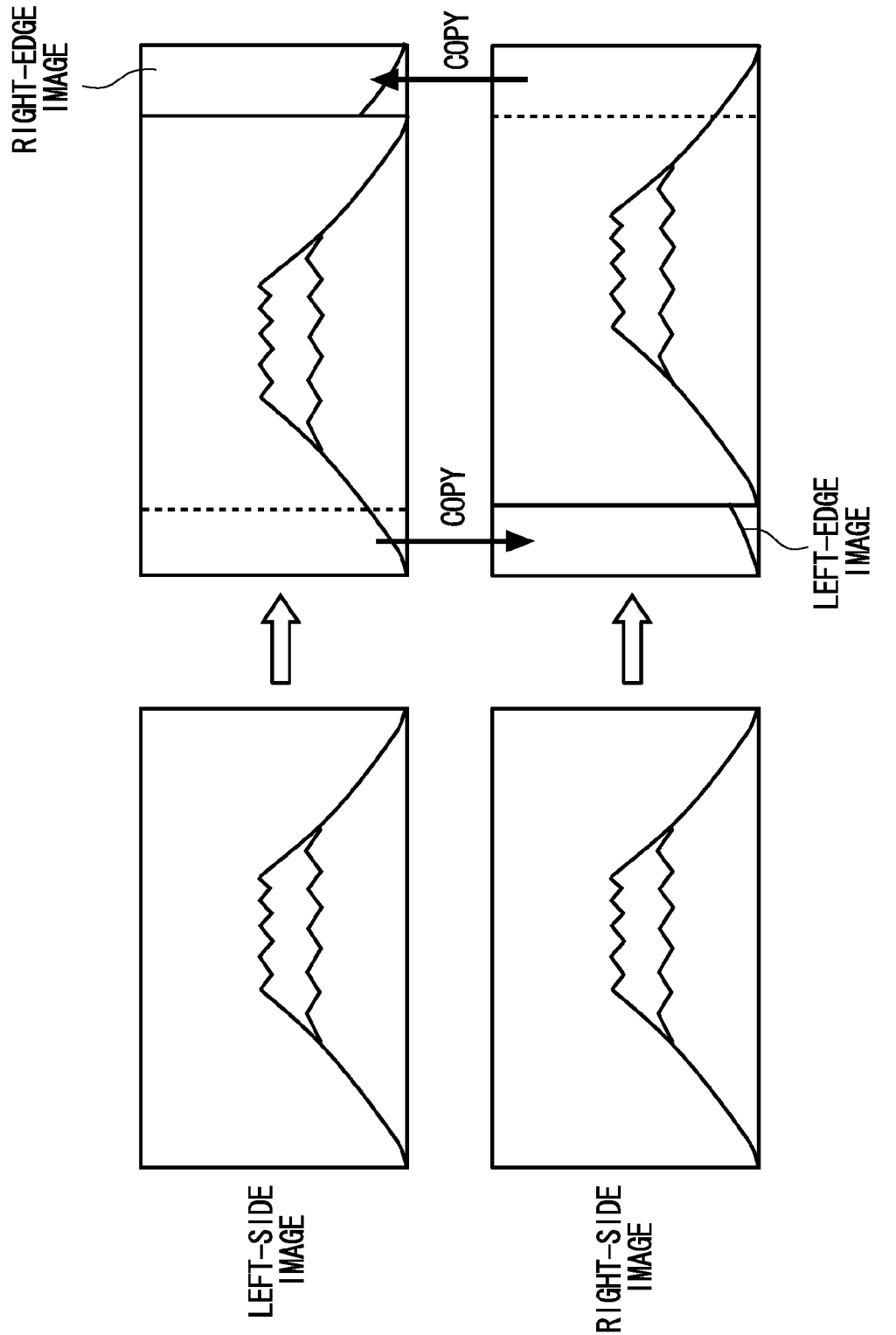
FIG. 7 shows an exemplary left-side image with a right-edge image obtained by copying a portion of the right-side image attached thereto and an exemplary right-side image with a left-edge image obtained by copying a portion of the left-side image attached thereto.

FIG. 7 shows an exemplary left-side image with a right-edge image obtained by copying a portion of the right-side image attached thereto and an exemplary right-side image with a left-edge image obtained by copying a portion of the left-side image attached thereto. The right-edge processing section 22 may attach to the right side of the left-side image, as the right-edge image, a portion of the right-side image that is displayed within a prescribed range from the right edge of the display region. The right-edge processing section 22 may attach to the right side of the left-side image, as the right-edge image, a copy of a portion of the right-side image that is displayed within a prescribed range from the right edge of the display region to the right edge of the left-side image.

The left-edge processing section 24 may attach to the left side of the right-side image, as the left-edge image, a portion of the left-side image that is displayed within a prescribed range from the left edge of the display region. The left-edge processing section 24 may attach to the left side of the right-side image, as the left-edge image, a copy of a portion of the left-side image that is displayed within a prescribed range from the left edge of the display region to the left edge of the right-side image.

If the lines of sight of the user converge when the user focuses on the right-edge portion or the left-edge portion of the display region, a problem occurs that the left eye and the right eye see different images. In this case, the image appears unnatural to the user, and this feeling increases when the image provided to the right eye and the image provided to the left eye are farther apart. However, the image processing apparatus 10 of the present embodiment provides the same image to the right eye and the left eye in the right-edge portion and the left-edge portion of the display region. Therefore, even when the lines of sight converge in the right-edge portion or the left-edge portion of the display region, the image processing apparatus 10 of the present embodiment can provide an image that does not appear unnatural by reducing the conflict between the lines of sight. Both eyes see the same image in the center of the display region, and therefore convergence is less likely to occur in the center than in the edge portions.

The right-edge processing section 22 may attach to the right side of the left-side image, as the right-edge image, an image obtained by blurring a portion of the right-side image that is displayed within a prescribed range from the right edge of the display region. The left-edge processing section 24 may attach to the left side of the right-side image, as the left-edge image, an image obtained by blurring a portion of the left-side image that is displayed within a prescribed range from the left edge of the display region.

If the images displayed to the right eye and the left eye have different focus levels, a person perceives the images stereoscopically. Therefore, even when the lines of sight converge in the right-edge portion or the left-edge portion of the display region, the image processing apparatus 10 of the present embodiment can reduce the conflict between the lines of sight and cause the user to perceive a stereoscopic image.

The right-edge processing section 22 may set the color of the right-edge image to be an average color of the portion of the right-side image displayed in the prescribed range from the right edge of the display region. Instead of this or in addition to this, the right-edge processing section 22 may set the brightness of the right-edge image to be an average brightness of the portion of the right-side image displayed in the prescribed range from the right edge of the display region. The left-edge processing section 24 may set the color of the left-edge image to be an average color of the portion of the left-side image displayed in the prescribed range from the left edge of the display region. Instead of this or in addition to this, the left-edge processing section 24 may set the brightness of the left-edge image to be an average brightness of the portion of the left-side image displayed in the prescribed range from the left edge of the display region. Therefore, even when the lines of sight converge in the right-edge portion or the left-edge portion of the display region, the image processing apparatus 10 can decrease the conflict between the lines of sight by providing the left eye and the right eye with images having the same color or the same brightness.

Figure 8:
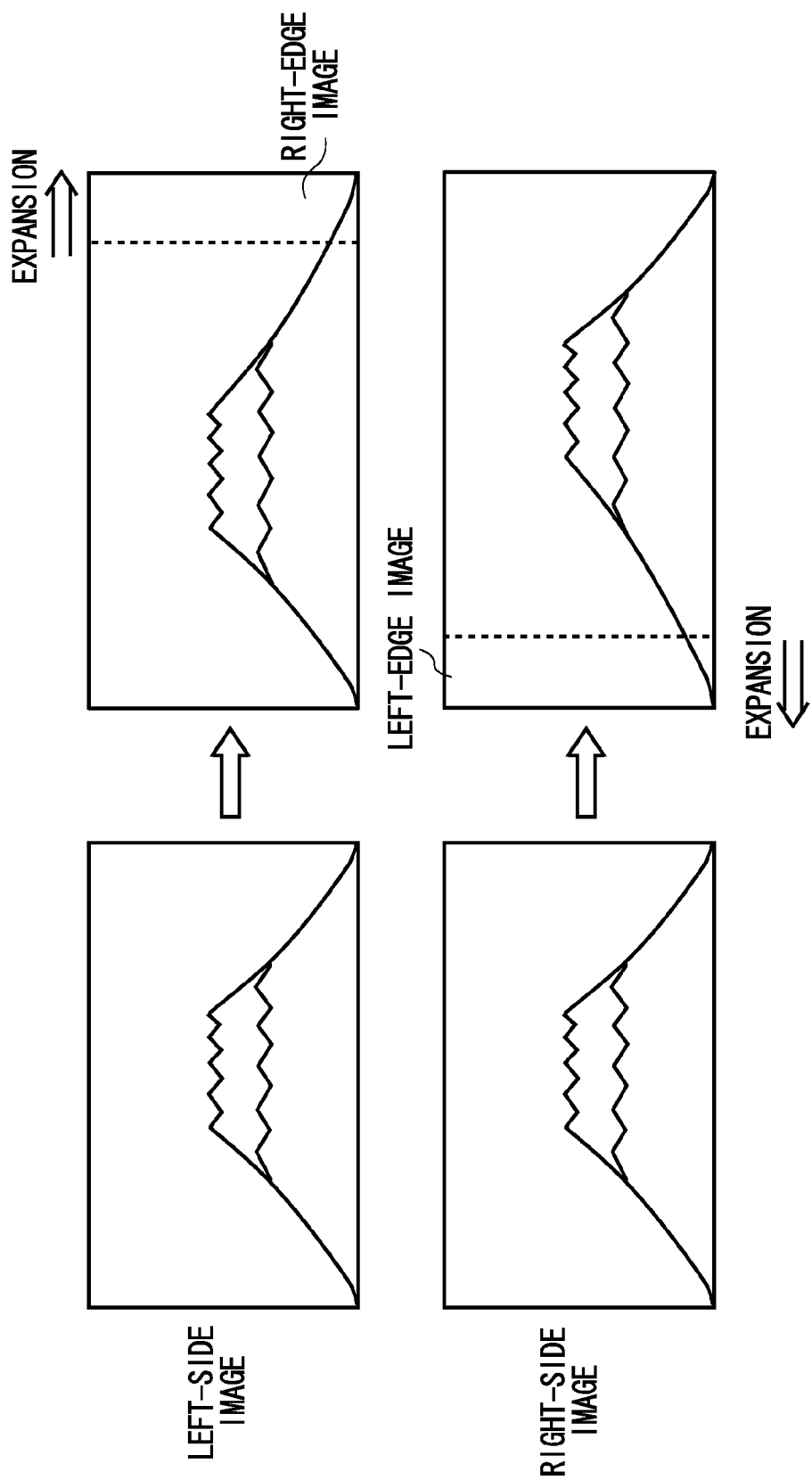
FIG. 8 shows an exemplary left-side image expanded to the right and an exemplary right-side image expanded to the left.

FIG. 8 shows an exemplary left-side image expanded to the right and an exemplary right-side image expanded to the left. The right-edge processing section 22 may generate an image that includes the right-edge image and the left-side image by expanding the left-side image to the right. In this case, the right-edge processing section 22 generates the image that includes the right-edge image and the left-side image by expanding the left-side image to the right with a rate of expansion that is greater closer to the left and right edges. Furthermore, the right-edge processing section 22 need not expand the left-side image from a prescribed position therein, i.e. from the center thereof.

The left-edge processing section 24 may generate an image that includes the left-edge image and the right-side image by expanding the right-side image to the left. In this case, the left-edge processing section 24 generates the image that includes the left-edge image and the right-side image by expanding the right-side image to the left with a rate of expansion that is greater closer to the left and right edges. Furthermore, the left-edge processing section 24 need not expand the right-side image from a prescribed position therein, i.e. from the center thereof. The image processing apparatus 10 of the present embodiment can provide a natural image that is continuous at the edges thereof.

The right-edge processing section 22 and the left-edge processing section 24 may expand the left-side image and the right-side image up and down, according to the expansion rate to the left and right. In this case, the right-edge processing section 22 and the left-edge processing section 24 delete portions of the left-side image and the right-side image that fall outside the display region due to the up and down expansion.

The right-edge processing section 22 may attach to the right side of the left-side image, as the right-edge image, an image obtained by repeating, to the right, a portion of the left-side image that is displayed within a prescribed range from the right edge of the display region, e.g. within one or more pixel columns from the right edge. The left-edge processing section 24 may attach to the left side of the right-side image, as the left-edge image, an image obtained by repeating, to the left, a portion of the right-side image that is displayed within a prescribed range from the left edge of the display region, e.g. within one or more pixel columns from the left edge. In this way, the image processing apparatus 10 can provide a natural image that is continuous at the edges thereof.

Figure 9:
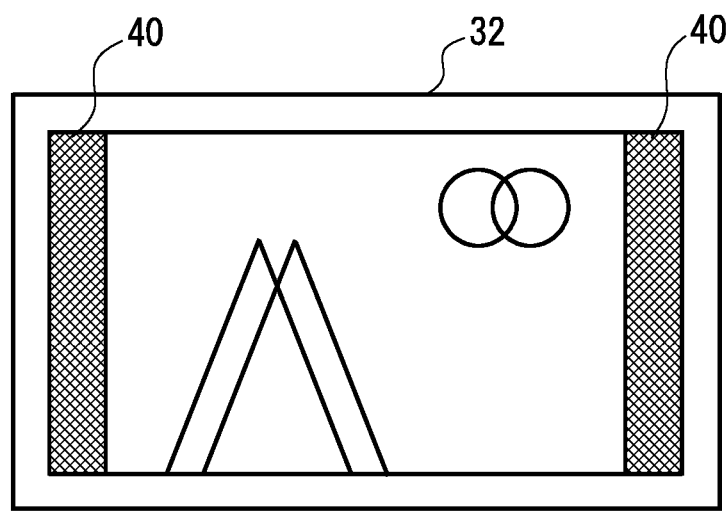
FIG. 9 shows an exemplary configuration of a display section 32 that displays the left-side image and the right-side image.

FIG. 9 shows an exemplary configuration of a display section 32 that displays the left-side image and the right-side image. The display section 32 may include a physical frame section 40 that covers the non-correspondence regions, in which the left-side image and the right-side image do not overlap, of the left-side image and right-side image displayed in the display region. The frame section 40 may be tape directly affixed to the display surface of the display section 32. Therefore, the image processing apparatus 10 can hide the images shown in the non-correspondence regions that cannot provide stereoscopic images, thereby providing the user with a natural stereoscopic image.

Figure 10:
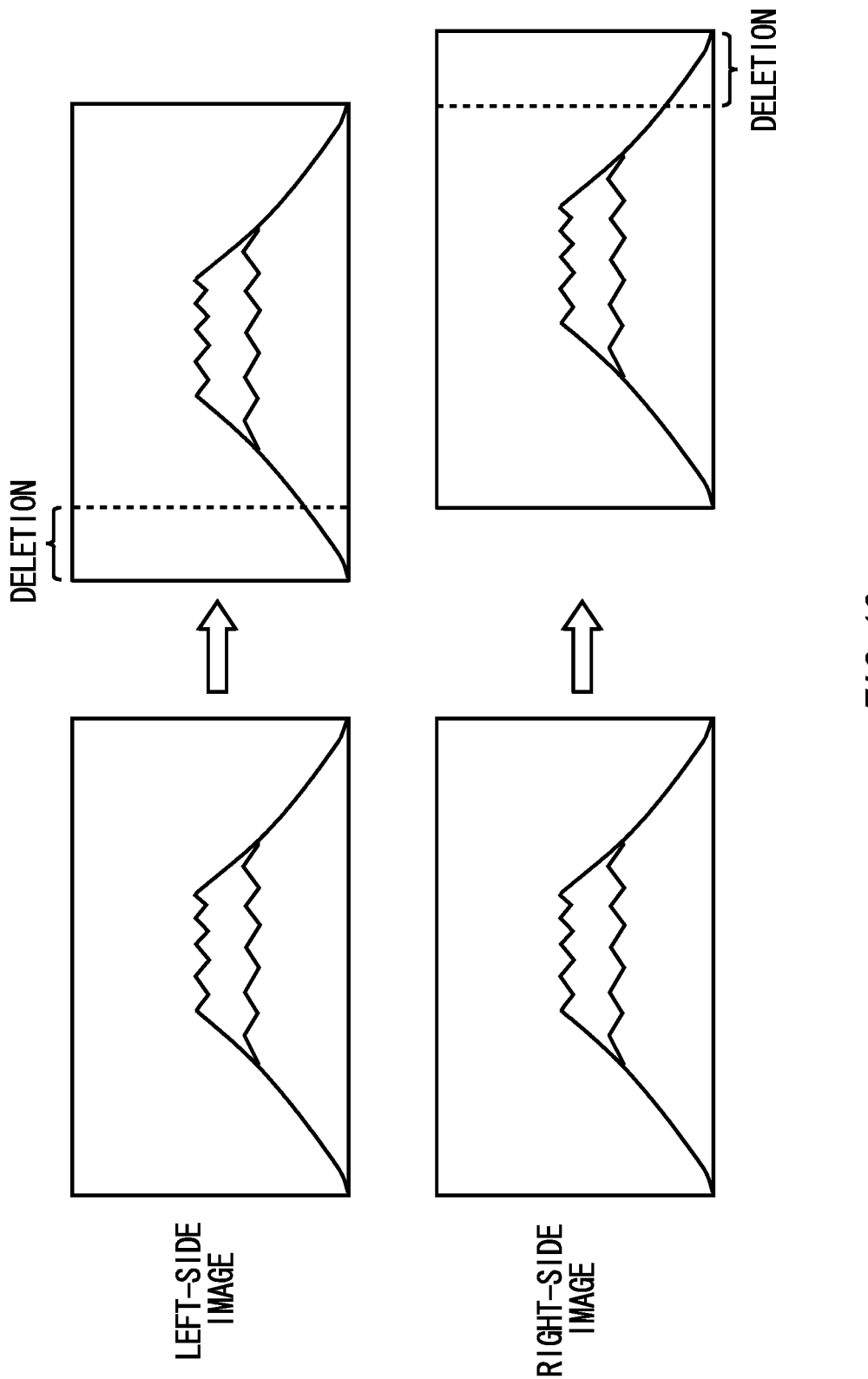
FIG. 10 shows an exemplary left-side image from which the left-edge portion is deleted and an exemplary right-side image from which the right-edge portion is deleted.

FIG. 10 shows an exemplary left-side image from which the left-edge portion is deleted and an exemplary right-side image from which the right-edge portion is deleted. Instead of attaching the right-edge image to the right side of the left-side image, the right-edge processing section 22 may delete a portion of the right-side image within a prescribed range from the right side thereof. Instead of attaching the left-edge image to the left side of the right-side image, the left-edge processing section 24 may delete a portion of the left-side image within a prescribed range from the left side thereof.

In this way, the image processing apparatus 10 can display an image that does not include the non-correspondence regions that cannot provide stereoscopic images. The display section 32 outputs a dark color, such as a black image, from the portion in the display region where the image was deleted. In this way, the image processing apparatus 10 can provide a natural stereoscopic image, in the same manner as when providing a frame as described in FIG. 9.

Figure 11:
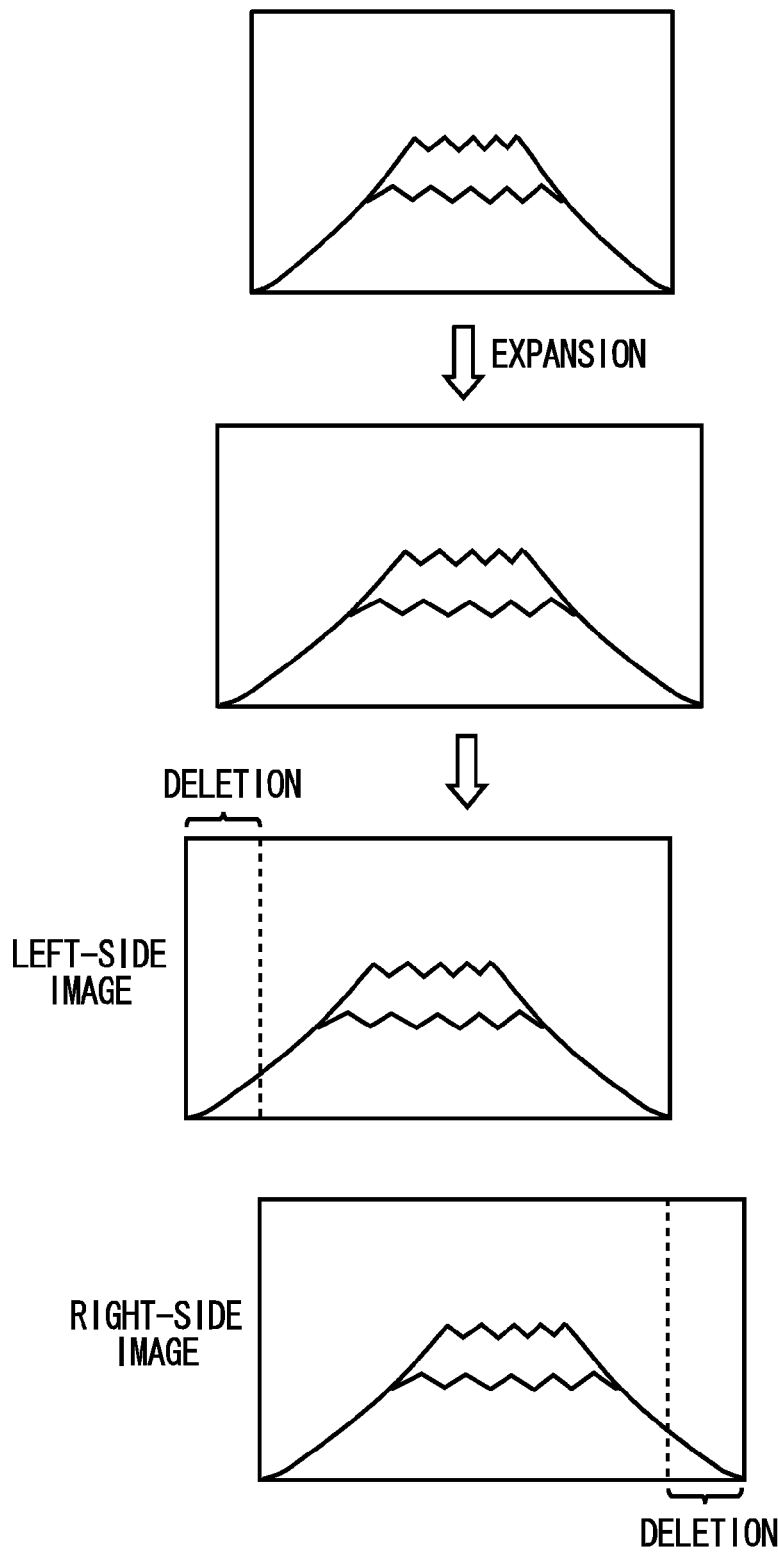
FIG. 11 shows an example of generating the left-side image and the right-side image after expanding the two-dimensional image.

FIG. 11 shows an example of generating the left-side image and the right-side image after expanding the two-dimensional image. The image processing apparatus 10 may perform the following processes, for example.

First, the generating section 20 expands the two-dimensional image to the left and right by prescribed distances. For example, the generating section 20 may expand the two-dimensional image to the left and right such that the horizontal width thereof is equal to the sum of the horizontal width of the display region and the distance between the pupils of the user. In this case, the generating section 20 may expand the two-dimensional image up and down with the same expansion rate used for the left and right expansion.

Next, the generating section 20 generates the right-side image and the left-side image by shifting the expanded two-dimensional image to the left and right in the display region by prescribed distances. For example, the generating section 20 may shift the left-side image to the left by half the distance between the pupils of the user and shift the right-side image to the right by half the distance between the pupils of the user.

Next, instead of attaching the right-edge image to the right side of the left-side image, the right-edge processing section 22 may delete a portion of the right-side image within a prescribed distance from the right side thereof. For example, the right-edge processing section 22 may delete a portion of the right-side image within a range equal to the distance between the pupils of the user from the right edge thereof.

Furthermore, instead of attaching the left-edge image to the left side of the right-side image, the left-edge processing section 24 may delete a portion of the left-side image within a prescribed distance from the left side thereof. For example, the left-edge processing section 24 may delete a portion of the left-side image within a range equal to the distance between the pupils of the user from the left edge thereof.

In this way, the image processing apparatus 10 can display an image that does not include the non-correspondence regions that cannot provide stereoscopic images. Therefore, the image processing apparatus 10 can provide a stereoscopic image that looks natural. When expanding the two-dimensional image up and down as well, the image processing apparatus 10 deletes portions of the right-side image and the left-side image that extend beyond the upper and lower boundaries of the display region.

Figure 12:
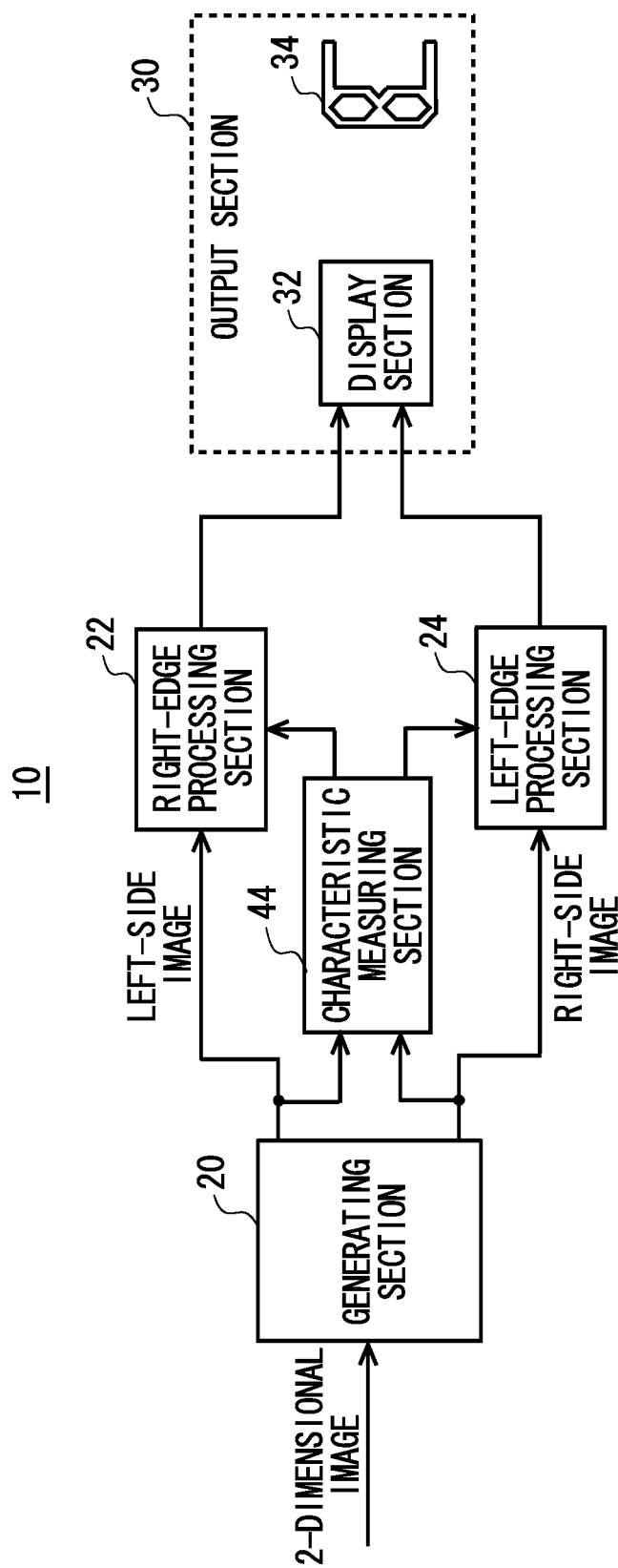
FIG. 12 shows a configuration of an image processing apparatus 10 according to a first modification of the first embodiment.

FIG. 12 shows a configuration of an image processing apparatus 10 according to a first modification of the first embodiment. The image processing apparatus 10 of the present modification adopts substantially the same function and configuration as the image processing apparatus 10 shown in FIG. 1, and therefore components having substantially the same function and configuration as those shown in FIG. 1 are given the same reference numerals and the following description includes only differing points.

The image processing apparatus 10 of the present modification further includes a characteristic measuring section 44. The characteristic measuring section 44 measures characteristics of the portion displayed in a prescribed range from the right edge of the display region in the right-side image generated by the generating section 20. The characteristic measuring section 44 also measures characteristics of the portion displayed in a prescribed range from the left edge of the display region in the left-side image generated by the generating section 20. The characteristic measuring section 44 may measure the spatial frequency, the average color, or the rate of change over time in each portion, for example.

The right-edge processing section 22 of the present modification selects, according to the characteristics of a portion of the right-side image displayed within the prescribed range from the right edge of the display region, whether to generate the right-edge image based on the image of this portion or to generate the right-edge image with predetermined display conditions. The left-edge processing section 24 of the present modification selects, according to the characteristics of a portion of the left-side image displayed within the prescribed range from the left edge of the display region, whether to generate the left-edge image based on the image of this portion or to generate the left-edge image with predetermined display conditions. Here, an image with predetermined display conditions refers to an image with a predetermined brightness or an image with a predetermined pattern, for example. The image processing apparatus 10 of the present modification can switch, according to characteristics of the images, between displaying an image that appears natural to a user when the lines of sight of the user converge and displaying a stereoscopic image that looks natural to the user through a frame.

When the spatial frequency of the portion of the right-side image displayed in the prescribed range from the right side of the display region is greater than or equal to a reference value, the right-edge processing section 22 may generate the right-edge image based on the image of this portion. When the spatial frequency of the portion of the right-side image displayed in the prescribed range from the right side of the display region is less than the reference value, the right-edge processing section 22 may generate the right-edge image with the predetermined display conditions. When the spatial frequency of the portion of the left-side image displayed in the prescribed range from the left side of the display region is greater than or equal to a reference value, the left-edge processing section 24 may generate the left-edge image based on the image of this portion. When the spatial frequency of the portion of the left-side image displayed in the prescribed range from the left side of the display region is less than the reference value, the left-edge processing section 24 may generate the left-edge image with the predetermined display conditions. In this way, at the edges of the display region, the image processing apparatus 10 can display images that appear natural even if the lines of sight of the user converge when important objects with high spatial frequency are displayed, and can provide a natural stereoscopic image seen through a frame when important objects with high spatial frequency are not displayed.

When the average color of the portion of the right-side image displayed in the prescribed range from the right side of the display region is outside a reference range, the right-edge processing section 22 may generate the right-edge image based on the image of this portion. When the average color of the portion of the right-side image displayed in the prescribed range from the right side of the display region is within the reference range, the right-edge processing section 22 may generate the right-edge image with the predetermined display conditions. When the average color of the portion of the left-side image displayed in the prescribed range from the left side of the display region is outside a reference range, the left-edge processing section 24 may generate the left-side image based on the image of this portion. When the average color of the portion of the left-side image displayed in the prescribed range from the left side of the display region is within the reference range, the left-edge processing section may generate the left-edge image with the predetermined display conditions. In this way, at the edges of the display region, the image processing apparatus 10 can display images that appear natural even if the lines of sight of the user converge when important objects with different colors from other portions are displayed, and can provide a natural stereoscopic image seen through a frame when important objects with different colors from other portions are not displayed.

The image processing apparatus 10 can stereoscopically display a series of two-dimensional images included in a moving image. In this case, when the rate of change over time of the portion of the right-side image displayed in the prescribed range from the right side of the display region is greater than or equal to a reference value, the right-edge processing section 22 may generate the right-edge image based on the image of this portion. When the rate of change over time of the portion of the right-side image displayed in the prescribed range from the right side of the display region is less than the reference value, the right-edge processing section 22 may generate the right-edge image with the predetermined display conditions. When the rate of change over time of the portion of the left-side image displayed in the prescribed range from the left side of the display region is greater than or equal to a reference value, the left-edge processing section 24 may generate the left-edge image based on the image of this portion. When the rate of change over time of the portion of the left-side image displayed in the prescribed range from the left side of the display region is less than the reference value, the left-edge processing section 24 may generate the left-edge image with the predetermined display conditions. In this way, at the edges of the display region, the image processing apparatus 10 can display images that appear natural even if the lines of sight of the user converge when important objects with high rates of change over time are displayed, and can provide a natural stereoscopic image seen through a frame when important objects with high rates of change over time are not displayed.

The right-edge processing section 22 and the left-edge processing section 24 may switch the content of the generation process for the right-edge image and the left-edge image according to values input by the creator of the moving image or distance information used when controlling focus during image capturing of the two-dimensional images supplied thereto, for example. The right-edge processing section 22 and the left-edge processing section 24 may switch the content of the generation process for the right-edge image and the left-edge image according to the content of a scene of the moving image provided thereto.

Figure 13:
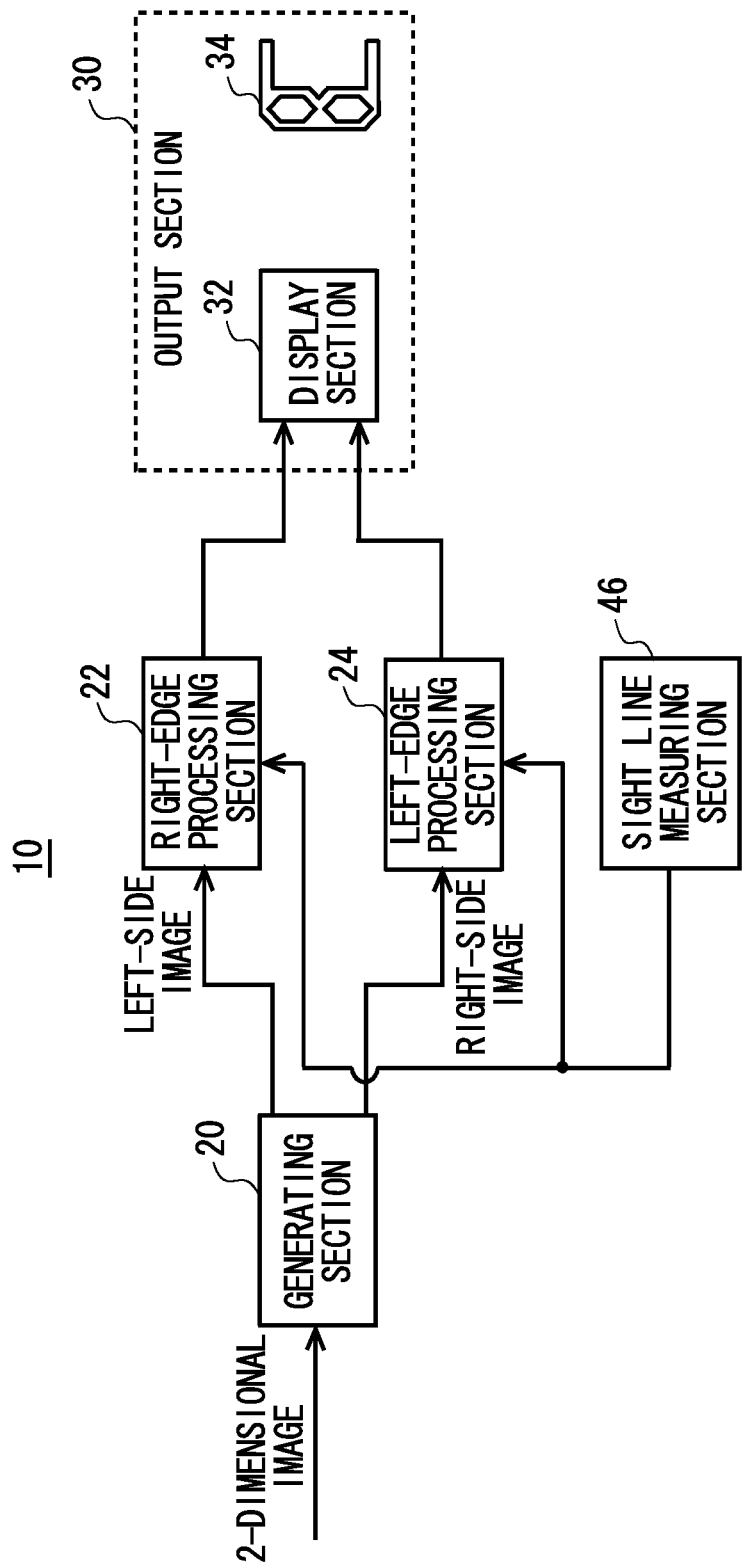
FIG. 13 shows a configuration of an image processing apparatus 10 according to a second modification of the first embodiment.

FIG. 13 shows a configuration of an image processing apparatus 10 according to a second modification of the first embodiment. The image processing apparatus 10 of the present modification adopts substantially the same function and configuration as the image processing apparatus 10 shown in FIG. 1, and therefore components having substantially the same function and configuration as those shown in FIG. 1 are given the same reference numerals and the following description includes only differing points.

The image processing apparatus 10 of the present modification further includes a sight line measuring section 46. The sight line measuring section 46 measures the line of sight of the user. The sight line measuring section 46 may detect the position of the eyes of the user from an image of the face of the user obtained using an image capturing sensor affixed to the display section 32, and measure the direction of the line of sight of the user. The sight line measuring section 46 may measure the line of sight of the user using a sensor provided in the stereoscopic viewing glasses 34, for example.

When the line of sight of the user is to the right of a reference region that includes the center of the display region, the right-edge processing section 22 may generate the right-edge image based on the image of this portion. When the line of sight of the user is not to the right of the reference region that includes the center of the display region, the right-edge processing section 22 may generate the right-edge image with predetermined display conditions. When the line of sight of the user is to the left of a reference region that includes the center of the display region, the left-edge processing section 24 may generate the left-edge image based on the image of this portion. When the line of sight of the user is not to the left of the reference region that includes the center of the display region, the left-edge processing section 24 may generate the left-edge image with predetermined display conditions. In this way, the image processing apparatus 10 can display images that appear natural even if the lines of sight of the user converge when the user looks at an edge portion of the display region, and can provide a natural stereoscopic image seen through a frame when the user looks at the center of the display region.

Figure 14:
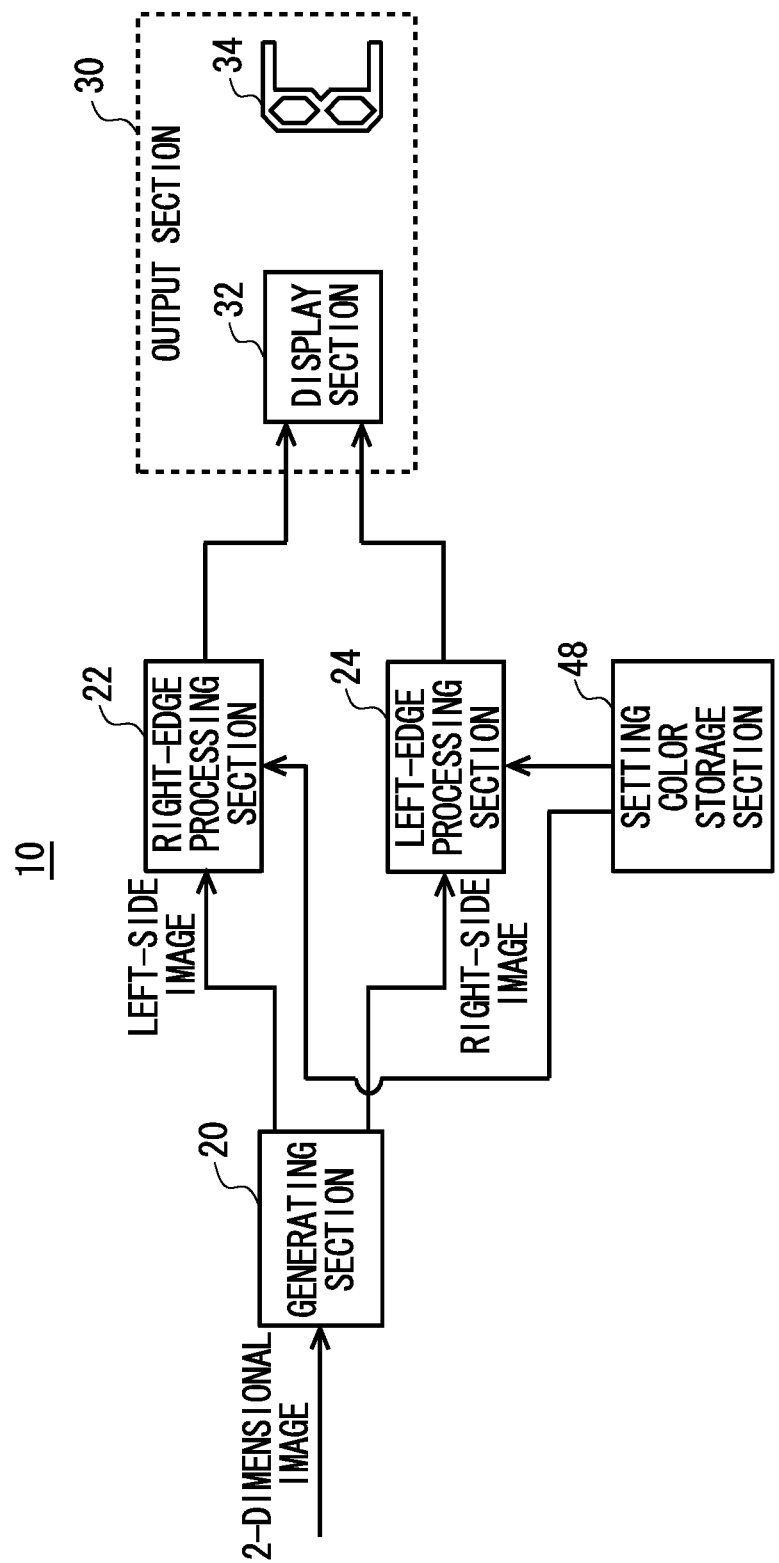
FIG. 14 shows a configuration of an image processing apparatus 10 according to a third modification of the first embodiment.

FIG. 14 shows a configuration of an image processing apparatus 10 according to a third modification of the first embodiment. The image processing apparatus 10 of the present modification adopts substantially the same function and configuration as the image processing apparatus 10 shown in FIG. 1, and therefore components having substantially the same function and configuration as those shown in FIG. 1 are given the same reference numerals and the following description includes only differing points.

The image processing apparatus 10 of the present modification further includes a setting color storage section 48. The setting color storage section 48 stores colors to be set for the right-edge image and the left-edge image.

The setting color storage section 48 may store a dark color such as black and a light color such as white. The setting color storage section 48 may store a color that is identical or similar to the color of the frame of the display apparatus. The setting color storage section 48 may store colors that differ according to horizontal position. The setting color storage section 48 may store colors that are designated by the user.

The right-edge processing section 22 and the left-edge processing section 24 of the present modification set the colors stored in the setting color storage section 48 as the colors of the right-edge image and the left-edge image. The image processing apparatus 10 of the present modification can display the right-edge image and the left-edge image with colors that decrease the conflict between the lines of sight of the user or colors that are suitable for making the user aware of the frame.

Figure 15:
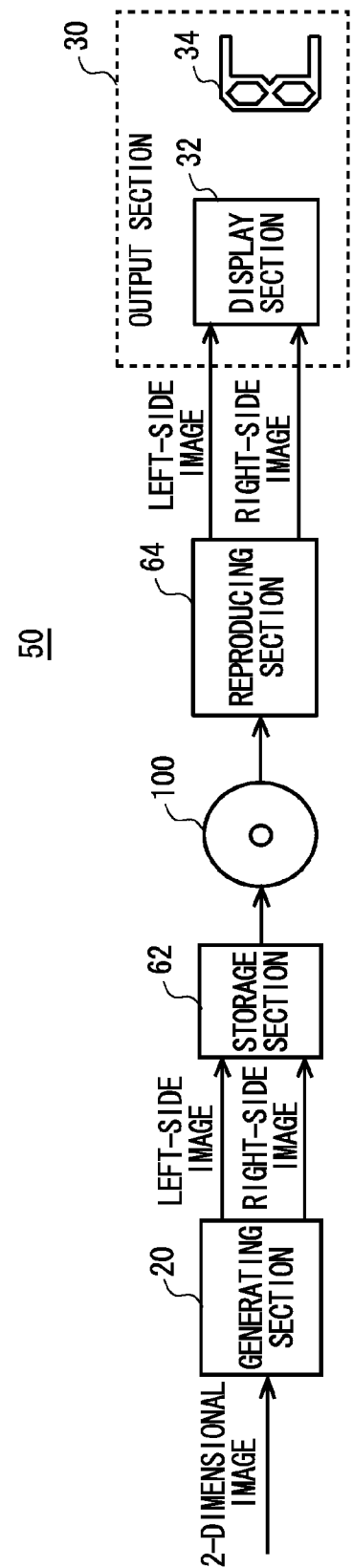
FIG. 15 shows a configuration of a recording/reproducing system 50 according to an embodiment of the present invention.

FIG. 15 shows a configuration of a recording/reproducing system 50 according to an embodiment of the present invention. The recording/reproducing system 50 generates data enabling a two-dimensional image to be displayed as a stereoscopic image, and records this data in a recording medium 100. The recording/reproducing system 50 reproduces the data from the recording medium 100 to display the stereoscopic image.

The recording/reproducing system 50 includes a generating section 20, a recording apparatus 62, a reproducing apparatus 64, and an output section 30. The generating section 20 and the output section 30 have the same function and configuration as the generating section 20 and the output section 30 described in relation to FIGS. 1 to 14. The recording/reproducing system 50 need not include the output section 30.

The recording apparatus 62 records, to the recording medium 100, the left-side image and the right-side image generated by the generating section 20. The reproducing apparatus 64 reads the left-side image and the right-side image recorded on the recording medium 100, and provides the read left-side image and right-side image to the output section 30.

The recording medium 100 records the image to be displayed stereoscopically that is read by the reproducing apparatus 64. The recording medium 100 includes a left-side image data storage region and a right-side image data storage region. The left-side image data storage region holds image data of the left-side image, which is generated by the two-dimensional image being shifted to the left in the display region and is read by the reproducing apparatus 64 to be provided to the left eye of the user. The right-side image data storage region holds image data of the right-side image, which is generated by the two-dimensional image being shifted to the right in the display region and is read by the reproducing apparatus 64 to be provided to the right eye of the user.

The recording/reproducing system 50 can generate a stereoscopic image that appears natural using a simple process, and store the stereoscopic image in the recording medium 100. The recording/reproducing system 50 can reproduce the data from the recording medium 100 to provide the user with the stereoscopic image.

Figure 16:
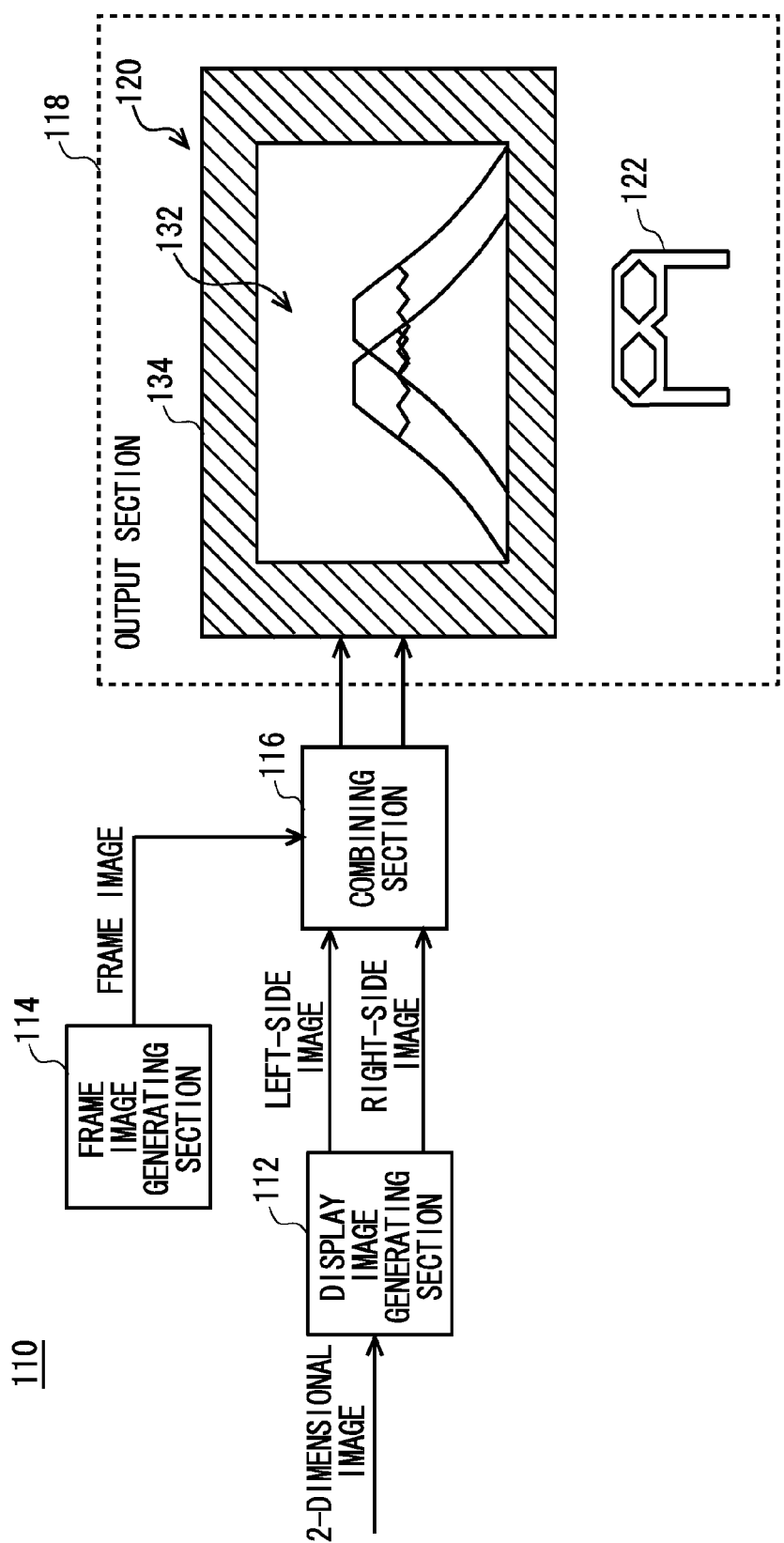
FIG. 16 shows a configuration of an image processing apparatus 110 according to a second embodiment of the present invention.

FIG. 16 shows a configuration of an image processing apparatus 110 according to a second embodiment of the present invention. The image processing apparatus 110 generates a display image from a two-dimensional image. More specifically, the image processing apparatus 110 generates an image to be output to the right eye of the user and an image to be output to the left eye of the user, based on the two-dimensional image supplied thereto, and displays the generated images on a display apparatus. The two-dimensional image may be a still image or may be a moving image that includes a series of still images that change over time.

The image processing apparatus 110 includes a display image generating section 112, a frame image generating section 114, a combining section 116, and an output section 118. The display image generating section 112 may receive the two-dimensional image from a receiving apparatus that receives transmitted data or from a reproducing apparatus that reproduces data from a recording medium, for example.

The display image generating section 112 generates a display image that is displayed within a frame provided on the border thereof, by shifting the two-dimensional image to the left and right by an amount that is not dependent on the objects displayed in the two-dimensional image. For example, the display image generating section 112 may generate the display image by shifting the two-dimensional image left and right by a predetermined shift amount according to the position within the two-dimensional image.

In the present embodiment, the display image generating section 112 generates the display image to include the left-side image for the left eye and the right-side image for the right eye by shifting the two-dimensional image left and right by a predetermined shift amount. More specifically, the display image generating section 112 generates the right-side image and the left-side image, by shifting the same two-dimensional image in the display region by no more than the distance between the right and left pupils of the user.

The display image generating section 112 generates the left-side image by shifting the original two-dimensional image to the left by a distance equal to half the distance between the pupils of the user, for example. The display image generating section 112 generates the right-side image by shifting the original two-dimensional image to the right by a distance equal to half the distance between the pupils of the user, for example. The display image generating section 112 may delete a portion of the left-side image, obtained by shifting the original two-dimensional image to the left, protruding to the left from the right-side border of the display region. The display image generating section 112 may delete a portion of the right-side image, obtained by shifting the original two-dimensional image to the right, protruding to the right from the left-side border of the display region.

The frame image generating section 114 generates a frame image to be displayed as a frame of the display region in which the display image is displayed. The frame image generating section 114 may generate the frame image to be displayed as a frame provided on at least a portion of a range of the display region in which the display image is displayed.

The combining section 116 combines the left-side image with the frame image, and supplies the resulting image to the output section 118. The combining section 116 also combines the right-side image with the frame image, and supplies the resulting image to the output section 118.

The output section 118 outputs the left-side image to the left eye of the user. The output section 118 outputs the right-side image to the right eye of the user. The output section 118 outputs the frame image to both the left eye and the right eye of the user.

In the present embodiment, the output section 118 includes a display section 120 and viewing glasses 122. The display section 120 includes a display image displaying section 132 and a frame image displaying section 134. The display image displaying section 132 displays the display image that includes the left-side image and the right-side image in the display region within the frame. The frame image displaying section 134 displays the frame image in the portion of the display region corresponding to the frame.

The display section 120 includes a plurality of pixels arranged in a two-dimensional matrix forming a display region in which pixel lines for displaying an image to the right eye of the user and pixel lines for displaying an image to the left eye of the user are arranged in an alternating manner, in the same manner as the display section 32 of the first embodiment shown in FIG. 2. The display section 120 displays the left-side image combined with the frame image using the left-eye pixel lines. The display section 120 may emit circularly-polarized light with a first rotational direction from the left-eye pixel lines.

The display section 120 displays the right-side image combined with the frame image using the right-eye pixel lines. The display section 120 may emit circularly-polarized light with a second rotational direction, which is the opposite of the first rotational direction, from the right-eye pixel lines. In this way, the display section 120 can display the display image that includes the left-side image and the right-side image in the display image displaying section 132 and display the frame image in the frame image displaying section 134.

The viewing glasses 122 transmit the image displayed by the pixel lines of the display section 120 displaying the image for the right eye to only the right eye of the user, and transmit the image displayed by the pixel lines of the display section 120 displaying the image for the left eye to only the left eye of the user. The viewing glasses 122 include a left-eye polarization filter, which is arranged over the left eye of the user to transmit circularly-polarized light having the first rotational direction and block circularly-polarized light having the second rotational direction, and a right-eye polarization filter, which is arranged over the right eye of the user to transmit circularly-polarized light having the second rotational direction and block circularly-polarized light having the first rotational direction.

The output section 118 including the display section 120 and the viewing glasses 122 can output the left-side image to the left eye of the user and output the right-side image to the right eye of the user. Furthermore, the output section 118 can output the frame image to both the left eye and the right eye of the user.

The output section 118 may have any configuration, as long as it can provide the left-side image to only the left eye of the user, provide the right-side image to only the right eye of the user, and provide the frame image to both the left eye and the right eye of the user. For example, the output section 118 may include a display apparatus that displays the left-side image combined with the frame image and the right-side image combined with the frame image alternately over time, and shuttered glasses having shutters synchronized with the display apparatus. In this case, the shuttered glasses open the left-eye shutter and close the right-eye shutter when the left-side image combined with the frame image is being displayed, and close the left-eye shutter and open the right-eye shutter when the right-side image combined with the frame image is being displayed.

As another example, the output section 118 may be a head-mounted display having a left-eye display region and a right-eye display region. The output section 118 may use color filters or differences in light splitting characteristics or polarization directions to provide the left-side image only to the left eye of the user and the right-side image only to the right eye of the user.

In the manner described above, the image processing apparatus 110 generates the display image by shifting a two-dimensional image to the left and right. As a result, the image processing apparatus 110 can provide a user with a display image at a low cost using an extremely simple process.

In the image processing apparatus 110, the frame image generating section 114 and the frame image displaying section 134 function as a frame section provided on at least a portion of the border of the display image. Accordingly, the image processing apparatus 110 can cause the display image to appear as if viewed through a frame. In other words, the image processing apparatus 110 can display the display image within a frame. As a result, the image processing apparatus 110 can provide a natural display image to the user, without the periphery of the display image appearing to be cut off.

The frame image generating section 114 may shift the frame image left and right by an amount that is less than the shift amount of the display image. In other words, the frame image generating section 114 may shift the frame image provided to the left eye, specifically the frame image combined with the left-side image, and the frame image provided to the right eye, specifically the frame image combined with the right-side image, such that the shift amount therebetween is less than the shift amount of the display image. For example, the frame image generating section 114 may generate the frame images with a shift amount of 0. In this way, the image processing apparatus 110 can provide the user with a natural display image by displaying the frame closer to the user than the display image.

The frame image displaying section 134 displays the frame image when the image processing apparatus 110 is displaying the display image, and does not display the frame image when the image processing apparatus 110 is not stereoscopically displaying the two-dimensional image. The frame image displaying section 134 may switch whether the display image is displayed based on received parameters that indicate whether the display image is to be displayed. In this way, when the display image is not being displayed, the image processing apparatus 110 can increase the effective display region.

If the output section 118 is a head-mounted display, the display image displaying section 132 and the frame image displaying section 134 display the display image and the frame image in the right-eye display region and the left-eye display region of the head-mounted display. In this case, the frame image generating section 114 generates the frame image to be shifted by an amount that causes the frame image to appear closer to the viewpoint of the user than the right-eye display region and the left-eye display region of the head-mounted display. In this way, the image processing apparatus 110 can provide the user with a natural display image by displaying the frame closer to the user than the display image.

By providing an image that does not create a parallax effect between the left and right eyes and that appears infinitely distant to the user, the image processing apparatus 110 can provide the user with an image that seems stereoscopic. For example, the image processing apparatus 110 can create the feeling that the user is looking through a window at an image of a landscape, in the same manner as the image processing apparatus 10 of the first embodiment. Furthermore, the image processing apparatus 110 can create the impression that an image captured close-up, such as using a macro exposure, is being viewed through a magnifying glass.

Figure 17:
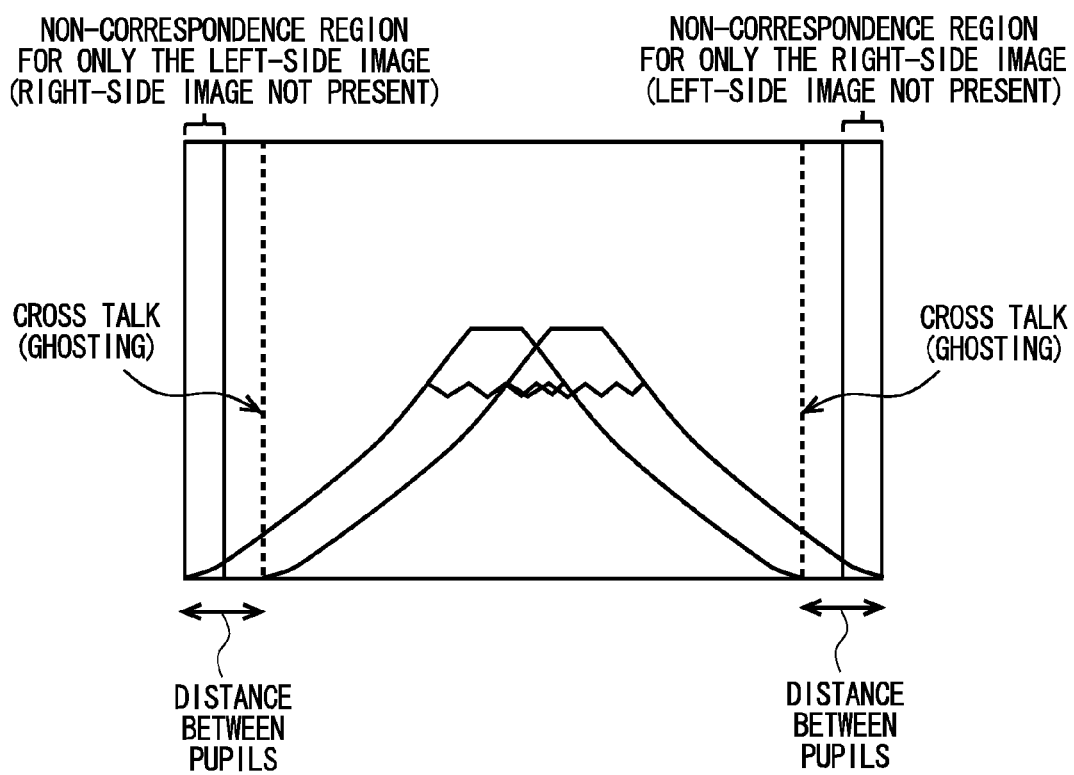
FIG. 17 shows an example of cross talk and non-correspondence regions in which only one of the left-side image and the right-side image is displayed.

FIG. 17 shows an example of cross talk and non-correspondence regions in which only one of the left-side image and the right-side image is displayed. When the frame image is not displayed, the left edge of the display region includes a non-correspondence region in which the left-side image, but not the right-side image, resulting from the shifting of one two-dimensional image to the left and right is displayed, i.e. a region in which the right-side image and the left-side image are not shown together. Similarly, when the frame image is not displayed, the right edge of the display region includes a non-correspondence region in which the right-side image, but not the left-side image, resulting from the shifting of one two-dimensional image to the left and right is displayed.

Cross talk, also referred to as ghosting, can be seen as a vertical line at a distance from the right edge of the display region equal to the distance between the pupils of the user and at a distance from the left edge of the display region equal to the distance between the pupils of the user. The cross talk and the non-correspondence regions cause the image to appear unnatural to the user.

Figure 18:
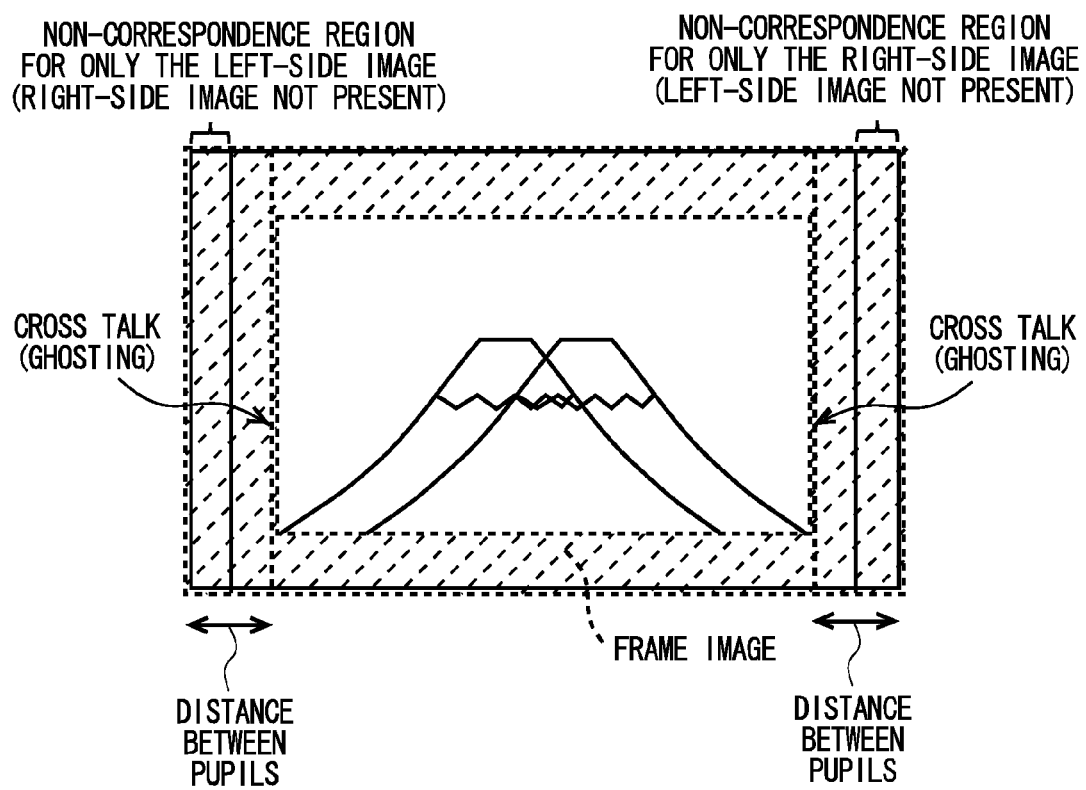
FIG. 18 shows an exemplary frame image.

FIG. 18 shows an exemplary frame image. The frame image generating section 114 preferably generates the frame image to cover at least the cross talk and non-correspondence regions in the display image. In other words, the frame image generating section 114 preferably generates the frame image to have a frame width at the left edge and the right edge thereof greater than or equal to the distance between the pupils of the user. In this way, the image processing apparatus 110 can provide the user with a natural display image by hiding the non-correspondence regions and cross talk portions that create a sense of unnaturalness in the display image.

The frame image generating section 114 may generate the frame image to include only a left-edge portion and a right-edge portion. In other words, the frame image generating section 114 may generate the frame image without an upper edge or a lower edge. In this way, the image processing apparatus 110 can provide the user with a display image in which at least the non-correspondence regions and cross talk portions are hidden.

Figure 19:
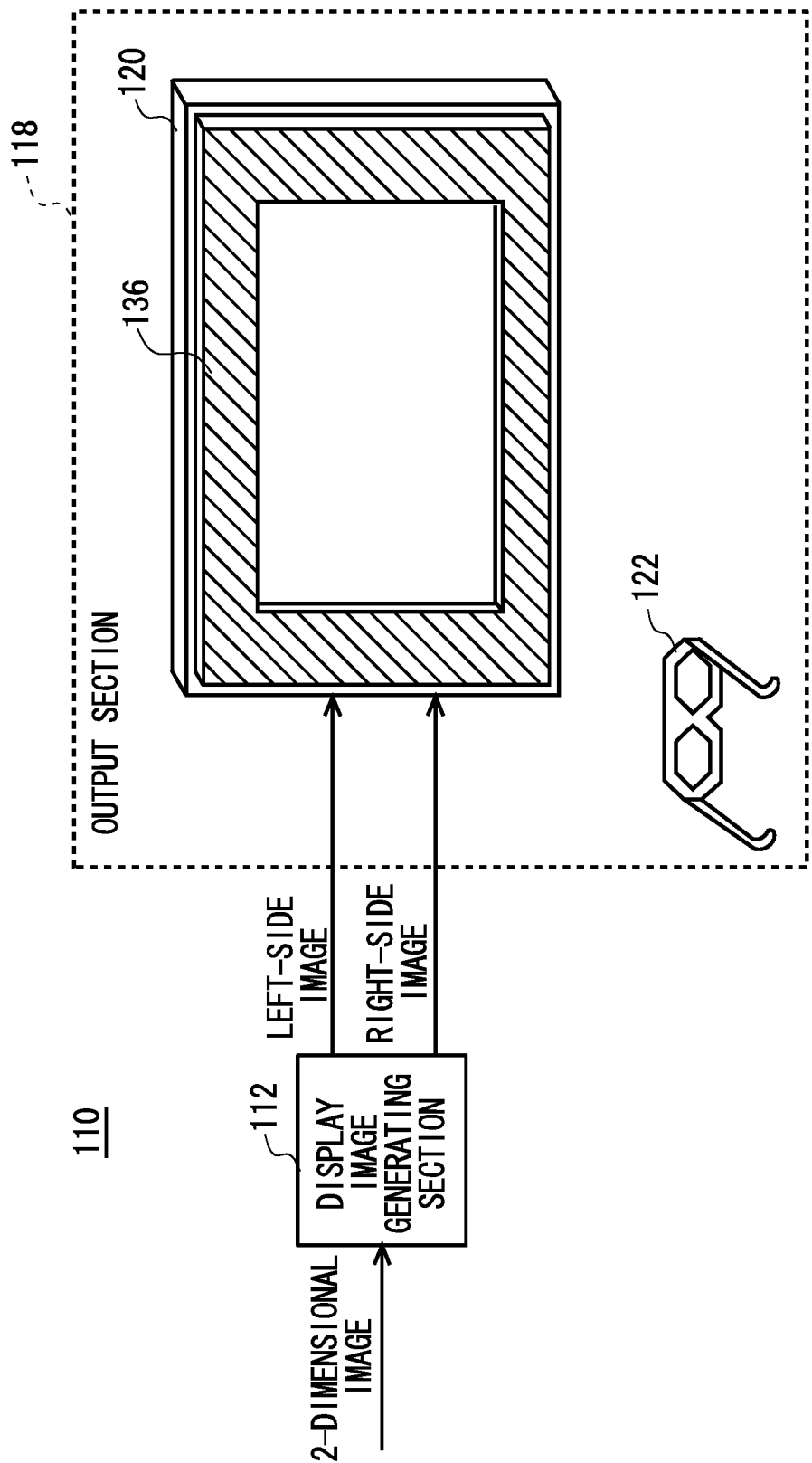
FIG. 19 shows a configuration of an image processing apparatus 110 according to a first modification of the second embodiment.

FIG. 19 shows a configuration of an image processing apparatus 110 according to a first modification of the second embodiment. The image processing apparatus 110 of the present modification adopts substantially the same function and configuration as the image processing apparatus 110 shown in FIG. 16, and therefore components having substantially the same function and configuration as those shown in FIG. 1 are given the same reference numerals and the following description includes only differing points.

The image processing apparatus 110 of the present modification includes the display image generating section 112 and the output section 118. In the present modification, the output section 118 includes the display section 120, the viewing glasses 122, and a frame section 136. The display section 120 displays the display image that includes the left-side image and the right-side image generated by the display image generating section 112.

The frame section 136 functions as the frame of the display image provided between the display section 120 and the user. The frame section 136 is provided in the edge portions of the screen of the display section 120.

The frame section 136 covers at least a portion of the display region in which the left-side image and the right-side image obtained by shifting the two-dimensional image left and right do not overlap, within the display image displayed by the display section 120. The frame section 136 preferably covers at least the non-correspondence regions and the cross talk portions included in the display image, in the same manner as the frame image shown in FIG. 18. In this way, the image processing apparatus 110 of the present modification can provide the user with a natural display image by hiding the non-correspondence regions and cross talk portions that create a sense of unnaturalness in the display image.

The frame section 136 may have a configuration to cover at least a portion of the display region in which the right-side image and left-side image do not overlap when the image processing apparatus 110 is displaying the display image, and to not cover this display region when the image processing apparatus 110 is not stereoscopically displaying the two-dimensional image. For example, the frame section 136 may move inward to cover the edge portions of the display surface of the display section 120 when the display image is displayed, and move outward to expose the entire display surface of the display section 120 when the display image is not displayed. In this way, when the display image is not being displayed, the frame section 136 can increase the effective display region.

Figure 20:
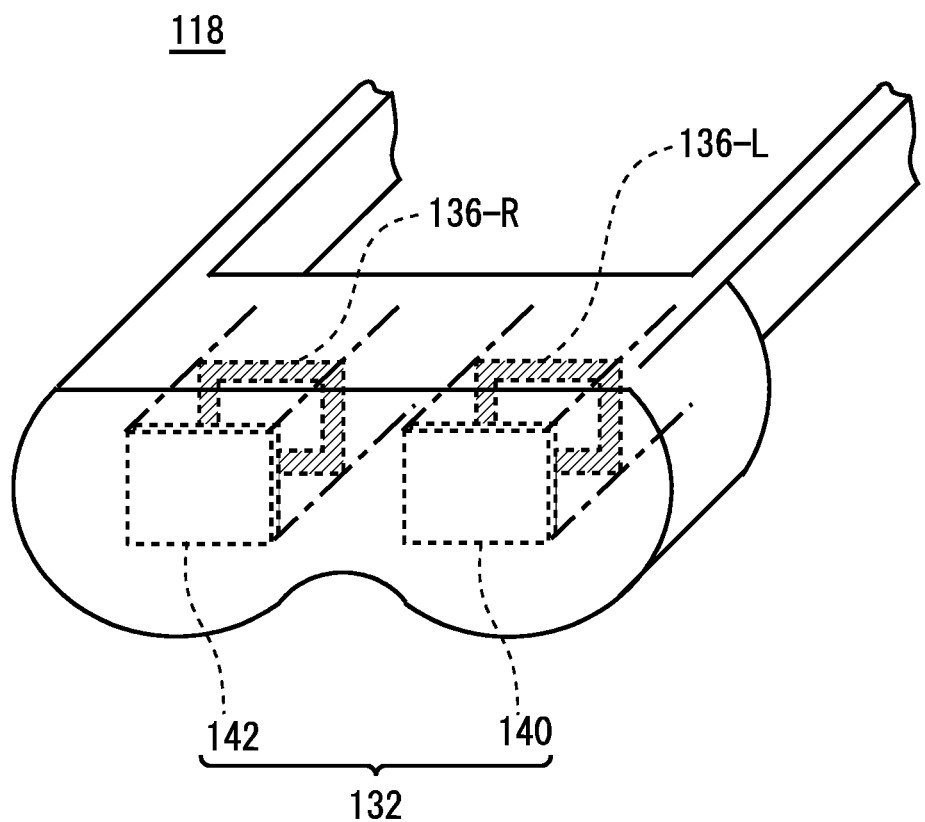
FIG. 20 shows a configuration of the output section 118 used in the image processing apparatus 110 according to a second modification of the second embodiment.

FIG. 20 shows a configuration of the output section 118 used in the image processing apparatus 110 according to a second modification of the second embodiment. The image processing apparatus 110 of the present modification adopts substantially the same function and configuration as the image processing apparatus 110 shown in FIG. 19, and therefore components having substantially the same function and configuration as those shown in FIG. 1 are given the same reference numerals and the following description includes only differing points.

The output section 118 of the present modification is a head-mounted display that is worn on the head of the user to display the display image to the user. The display image displaying section 132 displays the display image in the right-eye display region 142 and the left-eye display region 140 of the head-mounted display.

The output section 118 of the present modification includes a left-eye frame section 136-L and a right-eye frame section 136-R. The left-eye frame section 136-L covers a portion of the left-side image output from the left-eye display region 140. The right-eye frame section 136-R covers a portion of the right-side image output from the right-eye display region 142. The left-eye frame section 136-L and the right-eye frame section 136-R are provided closer to the viewpoint of the user than the left-eye display region 140 and the right-eye display region 142 of the head-mounted display. In this way, the image processing apparatus 110 of the present modification can provide the user with a natural display image by hiding the non-correspondence regions and cross talk portions that create a sense of unnaturalness in the display image.

Figure 21:
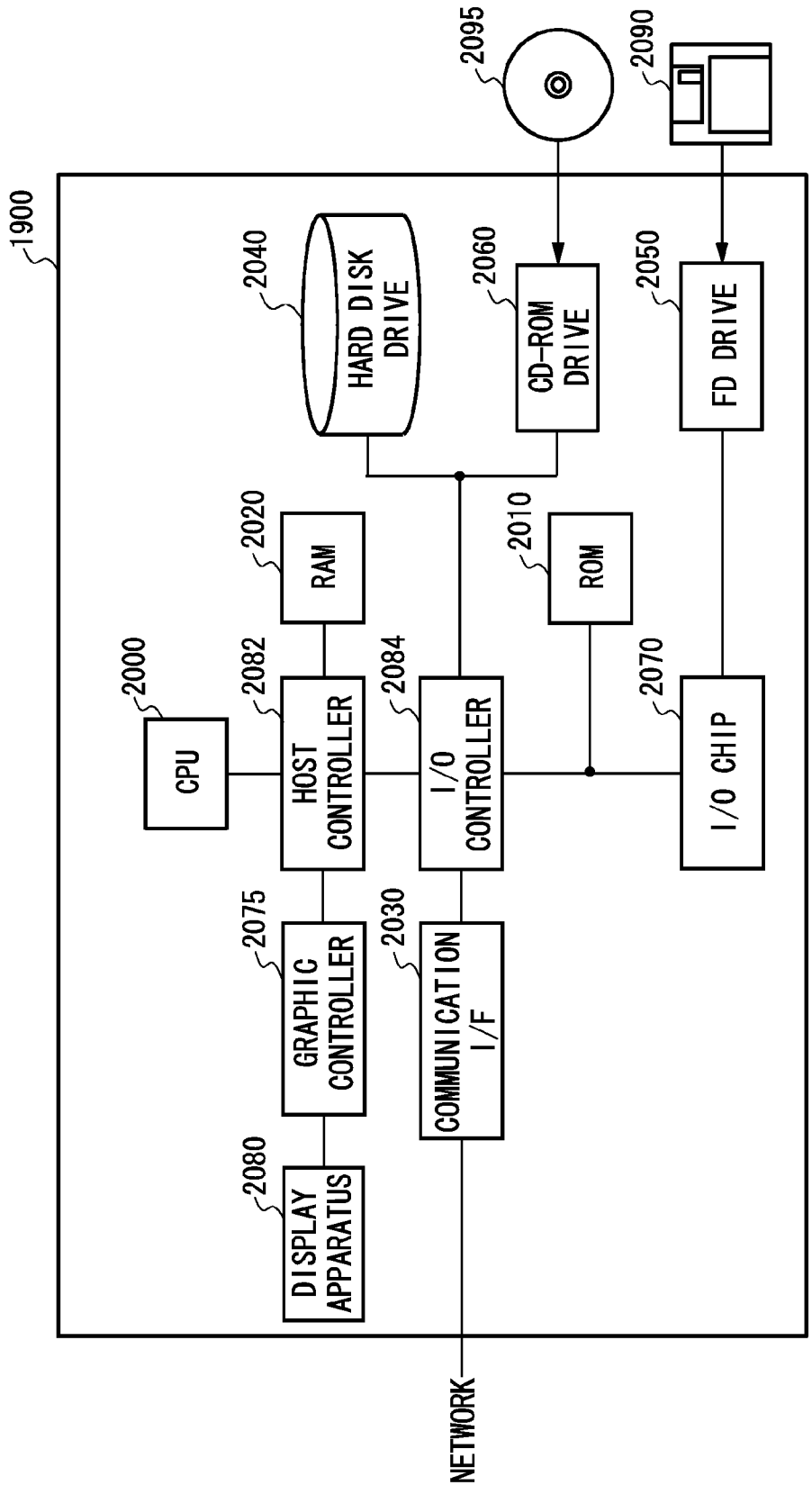
FIG. 21 shows an exemplary hardware configuration of a computer 1900 according to an embodiment of the present invention.

FIG. 21 shows an example of a hardware configuration of a computer 1900 according to an embodiment of the present invention. The computer 1900 according to the present embodiment is provided with a CPU peripheral including a CPU 2000, a RAM 2020, a graphic controller 2075, and a display apparatus 2080, all of which are connected to each other by a host controller 2082; an input/output section including a communication interface 2030, a hard disk drive 2040, and a CD-ROM drive 2060, all of which are connected to the host controller 2082 by an input/output controller 2084; and a legacy input/output section including a ROM 2010, a flexible disk drive 2050, and an input/output chip 2070, all of which are connected to the input/output controller 2084.

The host controller 2082 is connected to the RAM 2020 and is also connected to the CPU 2000 and graphic controller 2075 accessing the RAM 2020 at a high transfer rate. The CPU 2000 operates to control each section based on programs stored in the ROM 2010 and the RAM 2020. The graphic controller 2075 acquires image data generated by the CPU 2000 or the like on a frame buffer disposed inside the RAM 2020 and displays the image data in the display apparatus

2080. In addition, the graphic controller 2075 may internally include the frame buffer storing the image data generated by the CPU 2000 or the like.

The input/output controller 2084 connects the communication interface 2030 serving as a relatively high speed input/output apparatus, and the hard disk drive 2040, and the CD-ROM drive 2060 to the host controller 2082. The communication interface 2030 communicates with other apparatuses via a network. The hard disk drive 2040 stores the programs and data used by the CPU 2000 housed in the computer 1900. The CD-ROM drive 2060 reads the programs and data from a CD-ROM 2095 and provides the read information to the hard disk drive 2040 via the RAM 2020.

Furthermore, the input/output controller 2084 is connected to the ROM 2010, and is also connected to the flexible disk drive 2050 and the input/output chip 2070 serving as a relatively high speed input/output apparatus. The ROM 2010 stores a boot program performed when the computer 1900 starts up, a program relying on the hardware of the computer 1900, and the like. The flexible disk drive 2050 reads programs or data from a flexible disk 2090 and supplies the read information to the hard disk drive 2040 via the RAM 2020. The input/output chip 2070 connects the flexible disk drive 2050 to the input/output controller 2084 along with each of the input/output apparatuses via, a parallel port, a serial port, a keyboard port, a mouse port, or the like.

The programs provided to the hard disk drive 2040 via the RAM 2020 are stored in a recording medium, such as the flexible disk 2090, the CD-ROM 2095, or an IC card, and provided by a user. The programs are read from a recording medium, installed in the hard disk drive 2040 inside the computer 1900 via the RAM 2020, and performed by the CPU 2000.

The computer 1900 functions as the image processing apparatus 10 of the first embodiment or the image processing apparatus 110 of the second embodiment. The programs installed in the computer 1900 to make the computer 1900 function as the image processing apparatus 10 of the first embodiment are provided with a generating module, a right-edge processing module, a left-edge processing module, and an output module. These programs and modules prompt the CPU 2000 or the like to make the computer 1900 function as the generating section 20, the right-edge processing section 22, the left-edge processing section 24, and the output section 30, respectively.

The information processes recorded in these programs are read by the computer 1900 to cause the computer 1900 to function as software and hardware described above, which are exemplified by the specific sections of the generating section 20, the right-edge processing section 22, the left-edge processing section 24, and the output section 30. With these specific sections, a unique image processing apparatus 10 suitable for an intended use can be configured to function by realizing the calculations or computations of information appropriate for the intended use of the computer 1900 of the present embodiment.

The programs installed in the computer 1900 to make the computer 1900 function as the image processing apparatus 110 of the second embodiment are provided with a display image generating module, a frame image generating module, a combining module, and an output module. These programs and modules prompt the CPU 2000 or the like to make the computer 1900 function as the display image generating section 112, the frame image generating section 114, the combining section 116, and the output section 118, respectively.

The information processes recorded in these programs are read by the computer 1900 to cause the computer 1900 to function as software and hardware described above, which are exemplified by the specific sections of the display image generating section 112, the frame image generating section 114, the combining section 116, and the output section 118. With these specific sections, a unique image processing apparatus 110 suitable for an intended use can be configured to function by realizing the calculations or computations of information appropriate for the intended use of the computer 1900 of the present embodiment.

For example, if there is communication between the computer 1900 and an external apparatus or the like, the CPU 2000 performs the communication program loaded in the RAM 2020, and provides the communication interface 2030 with communication processing instructions based on the content of the process recorded in the communication program. The communication interface 2030 is controlled by the CPU 2000 to read the transmission data stored in the transmission buffer area or the like on the storage apparatus, such as the RAM 2020, the hard disc 2040, the flexible disk 2090, or the CD-ROM 2095, and send this transmission data to the network, and to write data received from the network onto a reception buffer area on the storage apparatus. In this way, the communication interface 2030 may transmit data to and from the storage apparatus through DMA (Direct Memory Access). As another possibility, the CPU 2000 may transmit the data by reading the data from the storage apparatus or communication interface 2030 that are the origins of the transmitted data, and writing the data onto the communication interface 2030 or the storage apparatus that are the transmission destinations.

The CPU 2000 may perform various processes on the data in the RAM 2020 by reading into the RAM 2020, through DMA transmission or the like, all or a necessary portion of the database or files stored in the external apparatus such as the hard disk drive 2040, the CD-ROM drive 2060, the CD-ROM 2095, the flexible disk drive 2050, or the flexible disk 2090. The CPU 2000 writes the processed data back to the external apparatus through DMA transmission or the like. In this process, the RAM 2020 is considered to be a section that temporarily stores the content of the external storage apparatus, and therefore the RAM 2020, the external apparatus, and the like in the present embodiment are referred to as a memory, a storage section, and a storage apparatus. The variety of information in the present embodiment, such as the variety of programs, data, tables, databases, and the like are stored on the storage apparatus to become the target of the information processing. The CPU 2000 can hold a portion of the RAM 2020 in a cache memory and read from or write to the cache memory. With such a configuration as well, the cache memory serves part of the function of the RAM 2020, and therefore the cache memory is also included with the RAM 2020, the memory, and/or the storage apparatus in the present invention, except when a distinction is made.

The CPU 2000 executes the various processes such as the computation, information processing, condition judgment, searching for/replacing information, and the like included in the present embodiment for the data read from the RAM 2020, as designated by the command sequence of the program, and writes the result back onto the RAM 2020. For example, when performing condition judgment, the CPU 2000 judges whether a variable of any type shown in the present embodiment fulfills a condition of being greater than, less than, no greater than, no less than, or equal to another variable or constant. If the condition is fulfilled, or unfulfilled, depending on the circumstances, the CPU 2000 branches into a different command sequence or acquires a subroutine.

The CPU 2000 can search for information stored in a file in the storage apparatus, the database, and the like. For example, if a plurality of entries associated respectively with a first type of value and a second type of value are stored in the storage apparatus, the CPU 2000 can search for entries fulfilling a condition designated by the first type of value from among the plurality of entries stored in the storage apparatus. The CPU 2000 can then obtain the second type of value associated with the first type of value fulfilling the prescribed condition by reading the second type of value stored at the same entry.

The programs and modules shown above may also be stored in an external recording medium. The flexible disk 2090, the CD-ROM 2095, an optical recording medium such as a DVD or CD, a magneto-optical recording medium, a tape medium, a semiconductor memory such as an IC card, or the like can be used as the recording medium. Furthermore, a storage apparatus such as a hard disk or RAM that is provided with a server system connected to the Internet or a specialized communication network may be used as a recording medium to provide the programs to the computer 1900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An image processing apparatus that stereoscopically displays a two-dimensional image, comprising:
    a generating section that generates a left-side image by shifting the two-dimensional image left in a display region, and generates a right-side image by shifting the two-dimensional image right in the display region;
    a right-edge processing section that attaches a right-edge image, which is displayed within a prescribed range from a right edge of the display region, to a right side of the left-side image;
    a left-edge processing section that attaches a left-edge image, which is displayed within a prescribed range from a left edge of the display region, to a left side of the right-side image; and
    an output section that outputs the left-side image with the right-edge image attached thereto to a left eye of a user and outputs the right-side image with the left-edge image attached thereto to a right eye of the user.

2. The image processing apparatus according to claim 1, wherein
    the generating section generates the left-side image and the right-side image based on the same two-dimensional image.

3. The image processing apparatus according to claim 1, wherein
    the output section includes a display section that has a plurality of pixels arranged in a two-dimensional matrix and that includes the display region in which pixel lines that display an image to the left eye of the user and pixel lines that display an image to the right eye of the user are arranged in an alternating manner, and
    the generating section generates the left-side image from pixels of the two-dimensional image corresponding to the pixel lines in the display region that display the image to the left eye, and generates the right-side image from pixels of the two-dimensional image corresponding to the pixel lines in the display region that display the image to the right eye.

4. The image processing apparatus according to claim 1, wherein
    the generating section generates the left-side image and the right-side image by shifting the two-dimensional image to the left and right within the display region by a distance no greater than a distance between pupils of the user.

5. The image processing apparatus according to claim 4, wherein
    the generating section generates the left-side image and the right-side image by shifting the two-dimensional image to the left and right by an amount whereby line of sight of the left eye is shifted left by no more than three degrees from a parallel state and line of sight of the right eye is shifted right by no more than three degrees from the parallel state.

6. The image processing apparatus according to claim 4, wherein
    the generating section generates the left-side image and the right-side image by shifting the two-dimensional image to the left and right within the display region by a distance greater than 0 and less than or equal to 90 mm.

7. The image processing apparatus according to claim 1, wherein
    the right-edge processing section attaches to the right side of the left-side image, as the right-edge image, a portion displayed within a prescribed range from the right edge of the display region in the right-side image, and
    the left-edge processing section attaches to the left side of the right-side image, as the left-edge image, a portion displayed within a prescribed range from the left edge of the display region in the left-side image.

8. The image processing apparatus according to claim 1, wherein
    the right-edge processing section attaches to the right side of the left-side image, as the right-edge image, an image obtained by blurring a portion displayed within a prescribed range from the right edge of the display region in the right-side image, and
    the left-edge processing section attaches to the left side of the right-side image, as the left-edge image, an image obtained by blurring a portion displayed within a prescribed range from the left edge of the display region in the left-side image.

9. The image processing apparatus according to claim 1, wherein
    the right-edge processing section generates an image that includes the left-side image and the right-edge image by expanding the left-side image to the right, and
    the left-edge processing section generates an image that includes the right-side image and the left-edge image by expanding the right-side image to the left.

10. The image processing apparatus according to claim 9, wherein
    the right-edge processing section generates an image that includes the left-side image and the right-edge image by expanding the left-side image to the right using a larger expansion rate closer to the left and right edges, and
the left-edge processing section generates an image that includes the right-side image and the left-edge image by expanding the right-side image to the left using a larger expansion rate closer to the left and right edges.

11. The image processing apparatus according to claim 1, wherein
the right-edge processing section attaches to the right side of the left-side image, as the right-edge image, an image obtained by repeating, toward the right, a portion of the left-side image displayed within a prescribed range from the right edge of the display region, and
the left-edge processing section attaches to the left side of the right-side image, as the left-edge image, an image obtained by repeating, toward the left, a portion of the right-side image displayed within a prescribed range from the left edge of the display region.

12. The image processing apparatus according to claim 1, wherein
the right-edge processing section selects, according to characteristics of a portion displayed in a prescribed range from the right edge of the display region in the right-side image, whether to generate the right-edge image based on an image of this displayed portion or to generate the right-edge image with predetermined display conditions, and
the left-edge processing section selects, according to characteristics of a portion displayed in a prescribed range from the left edge of the display region in the left-side image, whether to generate the left-edge image based on an image of this displayed portion or to generate the left-edge image with predetermined display conditions.

13. The image processing apparatus according to claim 12, wherein
when a spatial frequency of the portion displayed in the prescribed range from the right edge of the display region in the right-side image is greater than or equal to the reference value, the right-edge processing section generates the right-edge image based on the image of this displayed portion,
when the spatial frequency of the portion displayed in the prescribed range from the right edge of the display region in the right-side image is less than a reference value, the right-edge processing section generates the right-edge image with the predetermined display characteristics,
when the spatial frequency of the portion displayed in the prescribed range from the left edge of the display region in the left-side image is greater than or equal to a reference value, the left-edge processing section generates the left-edge image based on the image of this displayed portion, and
when the spatial frequency of the portion displayed in the prescribed range from the left edge of the display region in the left-side image is less than the reference value, the left-edge processing section generates the left-edge image with the predetermined display characteristics.

14. The image processing apparatus according to claim 12, wherein
when an average color of the portion displayed in the prescribed range from the right edge of the display region in the right-side image is outside a reference range, the right-edge processing section generates the right-edge image based on the image of this displayed portion,
when the average color of the portion displayed in the prescribed range from the right edge of the display region in the right-side image is within the reference range, the right-edge processing section generates the right-edge image with the predetermined display characteristics
when the average color of the portion displayed in the prescribed range from the left edge of the display region in the left-side image is outside the reference range, the left-edge processing section generates the left-edge image based on the image of this displayed portion, and
when the average color of the portion displayed in the prescribed range from the left edge of the display region in the left-side image is within the reference range, the left-edge processing section generates the left-edge image with the predetermined display characteristics.

15. The image processing apparatus according to claim 9, wherein
the image processing apparatus can stereoscopically display a series of two-dimensional images included in a moving image,
when a rate of change over time of a portion displayed in a prescribed range from the right edge of the display region in the right-side image is greater than or equal to a reference value, the right-edge processing section generates the right-edge image based on an image of this displayed portion,
when the rate of change over time of the portion displayed in the prescribed range from the right edge of the display region in the right-side image is less than the reference value, the right-edge processing section generates the right-edge image with predetermined display characteristics,
when the rate of change over time of a portion displayed in a prescribed range from the left edge of the display region in the left-side image is greater than or equal to a reference value, the left-edge processing section generates the left-edge image based on an image of this displayed portion, and
when the rate of change over time of the portion displayed in the prescribed range from the left edge of the display region in the left-side image is less than the reference value, the left-edge processing section generates the left-edge image with predetermined display characteristics.

16. The image processing apparatus according to claim 1, further comprising a sight line measuring section that measures a direction of a line of sight of the user, wherein
when the direction of the line of sight is to the right of a reference range including a center of the display region, the right-edge processing section generates the right-edge image based on an image of a portion displayed in a prescribed range from the right edge of the display region,
when the direction of the line of sight is not to the right of the reference range including the center of the display region, the right-edge processing section generates the right-edge image with predetermined display conditions,
when the direction of the line of sight is to the left of the reference range including the center of the display region, the left-edge processing section generates the left-edge image based on an image of a portion displayed in a prescribed range from the left edge of the display region, and
when the direction of the line of sight is not to the left of the reference range including the center of the display region, the left-edge processing section generates the left-edge image with predetermined display conditions.

17. The image processing apparatus according to claim 1, further comprising a setting color storage section that stores a color to be set for the right-edge image and the left-edge image, wherein
the right-edge processing section and the left-edge processing section respectively set colors of the right-edge image and the left-edge image to be the color stored in the setting color storage section.

18. The image processing apparatus according to claim 1, wherein
the right-edge processing section sets a color of the right-edge image to be an average color of a portion displayed in a prescribed range from the right edge of the display region in the right-side image, and
the left-edge processing section sets a color of the left-edge image to be an average color of a portion displayed in a prescribed range from the left edge of the display region in the left-side image.

19. The image processing apparatus according to claim 1, wherein
the right-edge processing section sets brightness of the right-edge image to be an average brightness of a portion displayed in a prescribed range from the right edge of the display region in the right-side image, and
the left-edge processing section sets brightness of the left-edge image to be an average brightness of a portion displayed in a prescribed range from the left edge of the display region in the left-side image.

20. The image processing apparatus according to claim 1, wherein
the right-edge processing section deletes a prescribed range on the right side of the right-side image, instead of attaching the right-edge image to the right side of the left-side image, and
the left-edge processing section deletes a prescribed range on the left side of the left-side image, instead of attaching the left-edge image to the left side of the right-side image.

21. The image processing apparatus according to claim 1, wherein
the generating section generates the left-side image and the right-side image by expanding the two-dimensional image to the left and right by prescribed distances and shifting the expanded two-dimensional image to the left and right by prescribed distances in the display region,
the right-edge processing section deletes a prescribed range on the right side of the right-side image, instead of attaching the right-edge image to the right side of the left-side image, and
the left-edge processing section deletes a prescribed range on the left side of the left-side image, instead of attaching the left-edge image to the left side of the right-side image.

22. The image processing apparatus according to claim 1, wherein
the generating section generates the left-side image and the right-side image when the display region has a width expressed by Expression 1
Expression 1 is defined as $W \geq (3 \times L)+(2 \times D \times \sin(\theta/2))$,
W represents horizontal width of the display region,
D represents a distance from a viewpoint of the user to a display screen,
L represents a distance between pupils of the user, and
$\theta$ represents an angle of an effective field of vision of the user.

23. A recording medium storing thereon a program that causes a computer to function as the image processing apparatus of claim 1.

24. An image processing method for stereoscopically displaying a two-dimensional image, comprising:
generating a left-side image by shifting the two-dimensional image left in a display region, and a right-side image by shifting the two-dimensional image right in the display region;
attaching a right-edge image, which is displayed within a prescribed range from a right edge of the display region, to a right side of the left-side image;
attaching a left-edge image, which is displayed within a prescribed range from a left edge of the display region, to a left side of the right-side image; and
outputting the left-side image with the right-edge image attached thereto to a left eye of a user and outputting the right-side image with the left-edge image attached thereto to a right eye of the user.

25. A recording method for recording an image that enables a two-dimensional image to be displayed stereoscopically, comprising:
generating image data of a left-side image obtained by shifting the two-dimensional image left in a display region, and image data of a right-side image obtained by shifting the two-dimensional image right in the display region;
attaching a right-edge image, which is displayed within a prescribed range from a right edge of the display region, to a right side of the left-side image;
attaching a left-edge image, which is displayed within a prescribed range from a left edge of the display region, to a left side of the right-side image;
recording image data of the left-side image with the right-edge image attached thereto in a left-side image data storage region in a recording medium, the left-side image data storage region holding an image to be read by a reproducing apparatus and output to a left eye of a user; and
recording image data of the right-side image with the left-edge image attached thereto in a right-side image data storage region in the recording medium, the right-side image data storage region holding an image to be read by the reproducing apparatus and output to a right eye of the user.

26. A non-transitory recording medium storing thereon an image to be read by a reproducing apparatus and displayed stereoscopically, the recording medium comprising:
a left-side image data storage region holding image data of a left-side image generated by shifting a two-dimensional image left within a display region, that has attached to a right side thereof a right-edge image displayed within a prescribed range from a right side of the display region and that is read by the reproducing apparatus and output to a left eye of a user; and
a right-side image data storage region holding image data of the right-side image generated by shifting the two-dimensional image right within the display region, that has attached to a left side thereof a left-edge image displayed within a prescribed range from a left side of the display region and that is read by the reproducing apparatus and output to a right eye of the user.

* * * * *